United States Patent
Belhadj et al.

(10) Patent No.: US 9,344,208 B2
(45) Date of Patent: *May 17, 2016

(54) SYSTEMS AND METHODS FOR PACKET BASED TIMING OFFSET DETERMINATION USING TIMING ADJUSTMENT INFORMATION

(75) Inventors: Med Belhadj, Ottawa (CA); Hojjat Salemi, Ottawa (CA)

(73) Assignee: CORTINA SYSTEMS, INC., Sunnyvale, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/593,370

(22) Filed: Aug. 23, 2012

(65) Prior Publication Data

US 2012/0320794 A1    Dec. 20, 2012

Related U.S. Application Data

(63) Continuation of application No. 12/285,358, filed on Oct. 2, 2008, now Pat. No. 8,274,998.

(51) Int. Cl.
*H04J 3/06* (2006.01)
*H04L 12/28* (2006.01)

(52) U.S. Cl.
CPC ............. *H04J 3/0667* (2013.01); *H04J 3/065* (2013.01); *H04J 2203/0089* (2013.01)

(58) Field of Classification Search
CPC ...................................................... H04J 3/0667
USPC ................................................. 370/254, 516
See application file for complete search history.

(56) References Cited

U.S. PATENT DOCUMENTS

| | | |
|---|---|---|
| 6,366,660 B1 * | 4/2002 | Baiyor et al. ............ 379/211.01 |
| 2002/0163932 A1 | 11/2002 | Fischer et al. |
| 2003/0206559 A1 | 11/2003 | Trachewsky et al. |
| 2004/0167990 A1 * | 8/2004 | Peer .............................. 709/248 |
| 2004/0208158 A1 | 10/2004 | Fellman et al. |
| 2005/0195862 A1 | 9/2005 | Jones et al. |
| 2006/0056563 A1 | 3/2006 | Aweya et al. |
| 2006/0245454 A1 | 11/2006 | Balasubramanian et al. |
| 2006/0280182 A1 * | 12/2006 | Williams et al. .............. 370/394 |
| 2008/0069150 A1 | 3/2008 | Badt et al. |
| 2009/0016321 A1 * | 1/2009 | Li et al. ........................ 370/350 |
| 2009/0080339 A1 | 3/2009 | Duffield et al. |
| 2010/0074278 A1 | 3/2010 | Dobjelevski et al. |

OTHER PUBLICATIONS

IEEE Standard for a Precision Clock Synchronization Protocol for Networked Measurement and Control Systems, IEEE Instrumentation and Measurement Society, IEEE Std 1588TM-2008 (Revision of IEEE Std. 1588-2002), Jul. 24, 2008.*

Rodrigues, Silvana; IEEE-1588 and Synchronous Ethernet in Telecom; Vienna, Austria, Oct. 1-3, 2007.

(Continued)

*Primary Examiner* — Donald Mills
*Assistant Examiner* — Henry Baron

(57) ABSTRACT

Systems and methods for performing timing offset and or fractional frequency offset for the purpose of time and/or frequency synchronization are provided. Timing packets are exchanged between a master device and a slave device. In addition, timing adjustment information is received by the slave device. The slave device uses the timing adjustment information in conjunction with the transmit and receive times for the timing packets to estimate at timing offset and/or fractional frequency offset.

41 Claims, 16 Drawing Sheets

(56) References Cited

OTHER PUBLICATIONS

IEEE Standard for a Precision Clock Synchronization Protocol for Networked Measurement and Control Systems, IEEE Instrumentation and Measurement Society, IEEE Std 1588™-2008 (Revision of IEEE Std. 1588-2002), Jul. 24, 2008.

Office Action for U.S. Appl. No. 12/285,357, dated Dec. 13, 2013, 33 pages.
Bertsekas, Dimitri et al., "Data Networks" Second Edition, Prentice Hall, 1992, Section 3.1, pp. 149-151, Englewood Cliffs, New Jersey, U.S.A. (5 pages total including textbook cover pages).

* cited by examiner

SYSTEMS AND METHODS FOR PACKET BASED TIMING OFFSET DETERMINATION USING TIMING ADJUSTMENT INFORMATION

RELATED APPLICATION

This application is a continuation application of U.S. patent application Ser. No. 12/285,358, which was filed on Oct. 2, 2008, and is hereby incorporated by reference in its entirety.

FIELD

The application relates to systems and methods for packet based timing offset determination or for facilitating packet based timing offset determination.

BACKGROUND

Synchronization can involve synchronization of frequency and/or phase (time). Physical layer synchronization approaches, such as those employed with SONET (synchronous optical network)/SDH (synchronous digital hierarchy) or synchronous Ethernet, are based on CDR (clock and data recovery) techniques, and only provide frequency synchronization. Packet based synchronization can be used for synchronization of frequency and/or phase. Specific examples of packet based timing protocols include NTP (Network Time Protocol), typically employed over a WAN (Wide Area Network), PTP (Packet Timing Protocol) typically employed over LANs (Local Area Networks) or WANs, and DTI (Digital Timing Interface) typically for in-building applications.

Packet based timing protocols can be used to perform synchronization in time and/or frequency between a slave device (also referred to as a client) and a master device (also referred to as a server). A specific example of a timing protocol is the recently adopted PTP-1588V2 protocol defined in 1588-2008 IEEE "Standard for a Precision Clock Synchronization Protocol for Networked Measurement and Control Systems" hereby incorporated by reference in its entirety. With PTP-1588V2, each compliant network device modifies a "correction" field in PTP (packet timing protocol) packets to reflect a delay introduced by the network device. The slave device estimates a delay offset between the slave device and the master device using timestamps of the PTP packets and the correction field.

A simplified view of PTP-1588V2 is shown in FIG. 1. Each iteration of the protocol involves the transmission of a timing packet from the master device to the slave device, and the transmission of a timing packet from the slave device to the master device, not necessarily in that order. FIG. 1 shows multiple such iterations, and the first iteration generally indicated at 700 will be described by way of example. A master→slave timing packet 702 is transmitted from the master device to the slave device and a slave→master timing packet 704 is transmitted from the slave device to the master device. In FIG. 1, the time of transmission of timing packet 702 by the master is $t^a_0$. This time is communicated to the slave device in a subsequent packet (not shown). The time of receipt of timing packet 702 by the master is $t^b_0$, this being measured directly by the slave device. The time of transmission of timing packet 704 by the slave device is $t^c_0$, this being known to the slave device. The time of receipt of timing packet 704 by the master is $t^d_0$. This is made known to the slave device in another packet (not shown).

Phase calculations are performed as follows for each iteration:

$$\text{RTT(round trip time)} = D^{ms} + D^{sm} = t^b - t^a + t^d - t^c$$

where $D^{ms} = (t^b - t^a)$ is the delay from master to slave and where $D^{sm} = (t^d - t^c)$ is the delay from slave to master. If a symmetrical path is assumed, i.e. $D^{ms} = D^{sm}$, then:

$$D^{ms} = D^{sm} = \tfrac{1}{2}(t^b - t^a + t^d - t^c)$$

and it can be concluded that the time offset between the slave and the master for the particular exchange is $$\tfrac{1}{2}(D^{ms} + D^{sm})$$

Time is mainly affected by asymmetrical paths, i.e. paths where $D^{ms}$ is not equal to $D^{sm}$.

Frequency calculations are performed as follows:

$$\text{Fractional Frequency Offset(FFO)(or drift)} = (FO - FR)/FR \rightarrow FFO = (T^s + T^m)/T^m$$

where FO stands for frequency "observed", and FR stands for frequency "reference", and $T^s$ and $T^m$ are determined across iterations according to:

$$T^m_0 = t^a_1 - t^a_0$$

$$T^s_0 = t^b_1 - t^b_0$$

Frequency accuracy is mainly affected by packet delay variation.

Note that NTP is similar to PTP except the exchanges are started by the client (slave) and responded to by the server (master).

When applications require a high level of accuracy (e.g. 0.5 micro-second phase, and 16 part per billion frequency), packet delay variations and asymmetry of several milliseconds greatly degrade the accuracy of the phase and frequency calculations.

There are three main problems with packet based synchronization which are for the most part addressed through the use of the above-referenced correction field in PTPv2 compliant devices. These include PSV (packet delay variation), the asymmetrical paths, and topology changes. Typically, filtering these variations is difficult and highly sensitive to various network conditions.

BRIEF DESCRIPTION OF THE DRAWINGS

Embodiments of the invention will now be described with reference to the attached drawings in which.

DETAILED DESCRIPTION OF THE PREFERRED EMBODIMENTS

Embodiments of the application provide systems and methods that allow a slave device to estimate a timing offset and/or frequency offset between the slave device and a master device through the exchange of timing packets, taking into account timing adjustment information that pertains to at least part of a communications path between the slave device and the master device. The timing adjustment information is obtained by the slave device otherwise than from the timing packets.

As a specific example, if the PTP-1588V2 packet based timing protocol is implemented between a slave device and a master device, there may be legacy equipment in the communications path between the slave device and the master device that do not update the "correction" field. In this case, timing adjustment information can be employed by the slave device, possibly in conjunction with updates made to the correction field by compliant devices, to estimate the timing offset between the slave device and the master device. It is to be clearly understood that PTP-1588V2 is but one example of a packet based timing protocol to which embodiments of the application may be applied.

Further embodiments provide an external pluggable device that can be used to make a non-compliant network device, from a timing protocol perspective, behave as though it were compliant. Timing packets received by the network device that would normally be forwarded on without adjustment to reflect delay, are directed to a particular port to which is connected the external pluggable device. The external pluggable device makes the adjustments to the timing packet to reflect delay, for example by updating a "correction field" and returns the packet to the network device. The packet is then forwarded on through the network.

Figure 1:
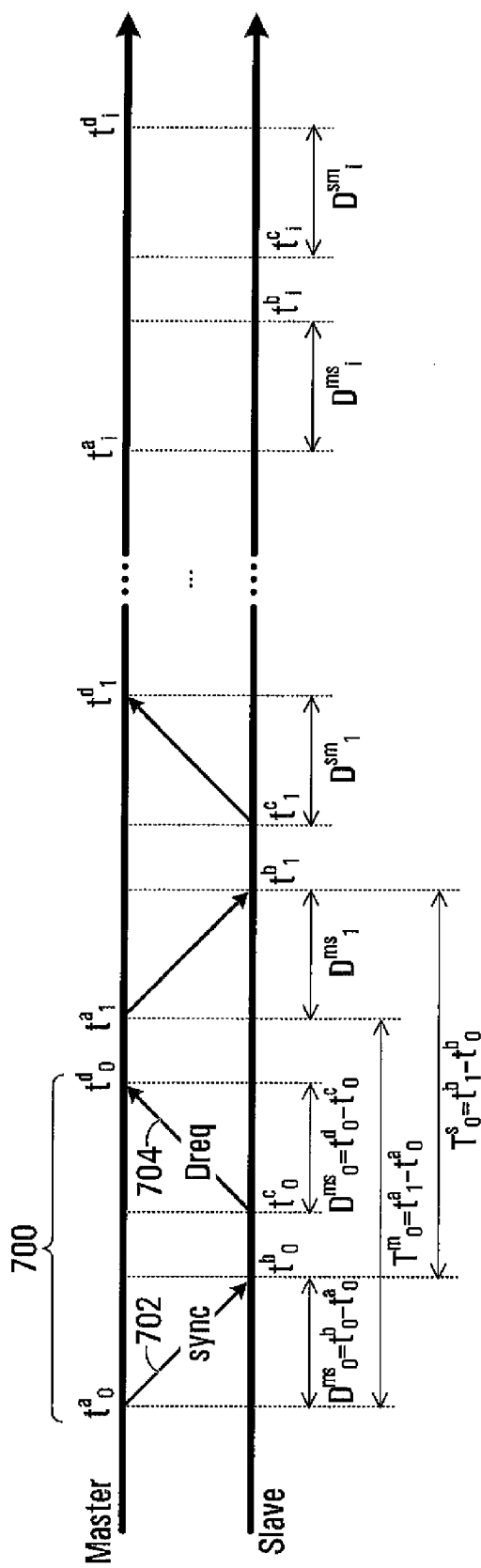
FIG. 1 is a timing diagram showing conventional PTP-1588V2 timing packet exchange.
Figure 2A:
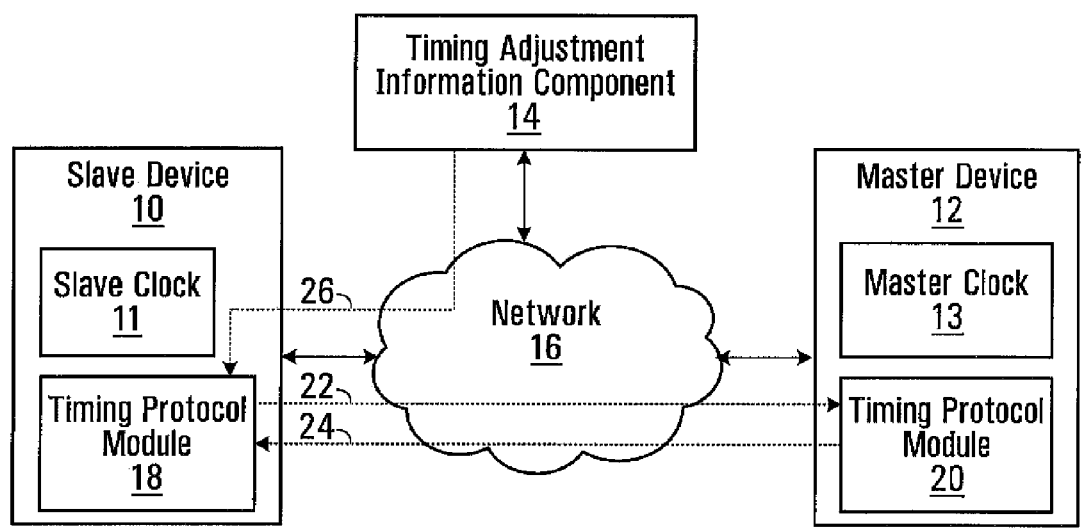
FIG. 2A is a block diagram of a system for performing packet based timing offset determination.

Referring now to FIG. 2A, shown is a block diagram of a system for performing packet based timing offset and/or frequency offset determination. Shown is a slave device 10 connected through a network 16 to a master device 12. Also shown is a timing adjustment information component 14 connected to the network 16. The slave device 10 has slave clock 11 and a timing protocol module 18. Correspondingly, the master device 12 has a master clock 13 and a timing protocol module 20.

In operation, slave-*master timing packets are transmitted from the slave device 10 to the master device 12 as generally indicated at 22. These pass through the network 16.

These packets are received by the master device 12 and processed by the timing protocol module 20. Similarly, master→slave timing packets are transmitted from the master device 12 to the slave device 10 as generally indicated at 24. These timing packets are received by the slave device 10 and processed by the timing protocol module 18. In addition, the slave device 10 receives timing adjustment information 26 from the timing adjustment information component 14. The timing adjustment information pertains to at least part of the communications path between the slave device 10 and the master device 12.

For timing offset determination, the timing protocol module 18 generates an estimate of the timing offset between the slave device 10 and the master device 12 using the timing adjustment information 26 and using transmit and receive times for the transmitted slave→master timing packets 22 and the received master→slave timing packets 24. Detailed examples of how the estimate of the timing offset may be generated are described below. There may be one or more transmitted timing packets 22 and one or more received timing packets 24 involved in generating these estimates. Time stamps may be communicated in the timing packets themselves and/or in separate packets. Time synchronization can then be performed on the basis of the timing offset thus determined.

For fractional frequency offset (FFO) determination, the timing protocol module 18 generates an estimate of the frequency offset between the slave device 10 and the master device 12 using the timing adjustment information 26 and using transmit and receive times for consecutive master→slave timing packets 24. Detailed examples of how the estimate of the frequency offset may be generated are described below. Time stamps may be communicated in the timing packets themselves and/or in separate packets. Frequency synchronization can then be performed on the basis of the fractional frequency offset thus determined.

In some embodiments, only one of timing offset determination and fractional frequency offset determination is performed. If only fractional frequency offset determination is performed, the transmission of timing packets from the slave device to the master device is not necessary. In other embodiments, both are performed.

In FIG. 2A, network 16 represents any network or networks that are used to form a communications path between the slave device 10 and the master device 12. These may include one or more networks that are entirely controlled by the same entity, one or more networks that are controlled by different entities, and one or more networks that are partially controlled by one or more entities, to name a few examples.

The slave device 10 can be any device that might be operating as a slave for the purpose of timing offset and/or fractional frequency offset determination. In some embodiments, a single master device 12 couples to multiple slave devices 10. An example of such a device includes a wireless base station that requires synchronization to a common frequency and phase reference.

The master device 12 can be any device that might operate as a master device for the purpose of timing offset and/or frequency offset determination. Examples of master devices include a timing server or a grand master. Note that in some implementations, the categorization of a device as a "slave" device or a "master" device can be performed dynamically, with a given device being capable of performing either or both the slave device and master device functions. The timing protocol module 18 of the slave device 10 and the timing protocol module 20 of the master device 12 can be typically implemented using software, hardware, firmware or some combination of these.

The timing adjustment information component 14 is shown as a component connected to network 16. This is a source for the timing adjustment information 26. Various detailed examples of what the timing adjustment information 26 might be are given below. This may for example be a server, but more generally may be any component capable of providing the timing adjustment information 26. Although shown as a separate device, the timing adjustment information component 14 can be combined with another device in the network such as the master device 12 or even a slave device 10. Note that in this example, the timing adjustment information 26 is provided separate from the transmitted timing packets 22 and the received timing packets 24.

The physical mechanism for communicating the timing adjustment information 26 from the timing adjustment information component 14 is implementation specific. A non-limiting set of examples includes the following:

employing DCC (Data Communication Channel) in SONET/SDH (Synchronous Digital Hierarchy) to carry the information;

DLL (data link layer) is a specific example of an in-band channel used to carry management and signalling information within OTN (Optical Transport Network) elements;

employing GCC (General Communication Channel) in OTN (Optical Transport Network) to carry the information;

employing management packets in pure Ethernet; and employing PTPv2 over UDP Signalling TLV (Type-Length-Value) in IP networks.

In some embodiments, the slave device 10 obtains the timing adjustment information 26 upon initialization and then obtains updates of the timing adjustment information after initialization. In some embodiments, these updates might be obtained when there is a change in the timing adjustment information 26, for example, when there is a change in the path used to communicate between slave device 10 and master device 12. Alternatively, the timing adjustment information might simply be obtained on a periodic basis.

Timing Adjustment Information

In some embodiments, the timing adjustment information includes topology information in respect of at least part of the communications path between the slave device 10 and the master device 12. From this topology information, the slave device 10 can determine the impact of the network 16 or parts thereof upon the timing offset and/or frequency offset. Alternatively, the timing adjustment information 26 can be more directly representative of some or all of the timing offset introduced by the network 16. For example, topology information might be used to indicate the number and type of network devices forming part of the communications path between the slave device 10 and the master device 12. Timing adjustment information that indicates the delay introduced by one or more network devices in the path would be a more direct representation of the timing offset.

The following is a set of examples of what the timing adjustment information might comprise. More generally, the timing adjustment information that is provided is implementation specific. Note that not all of this information is transmitted in every embodiment; different embodiments may use different combinations of this or other information:

number of network devices in the communications path;

an indication that the communications path is composed of one of a heterogeneous set of network devices and a homogeneous set of network devices;

an indication that the communications path is composed of some number of homogeneous sets of network devices;

a depth in number of network devices;

at least one basic characteristic of at least one network device;

an indication of load types (network conditions such as what percentage of interface is used, traffic type, packet distribution, priority, etc; this information changes with time and can be sent regularly; management software can be employed to extract this information for the network devices);

an estimated jitter and delay on a main and protection path;

an indication of whether load sharing is enabled, for example when a packet can take one of two paths based on sharing the load "e.g. link aggregation";

an indication of whether a protection event is provided and a maximum delay for protection notification. For example if a fiber cut occurs and the topology needs to be changed, a notification of this event and the new path may be sent to the slave to inform it of the new path delay to the master. The slave might for example be notified within a specified time after the path changes, for example within 5 s; and changes in a LCAS (link capacity adjustment scheme). These can cause the worst case packet to packet delay. Given the semi-static nature of LCAS, it can be modeled as a path (route) change. The same issue arises with a protection re-route of a path given that it may take, for example, 50 ms to change route.

In some embodiments, the timing adjustment information includes topology type information that identifies a type of topology relevant to the communications path. This type might be relevant to the entire path, or to portions of the path. For example, network 16 may be made up of multiple different networks each having their own topology types. In some embodiments, topology type information identifies one of a set of pre-defined possible configurations.

The following is a specific non-exhaustive set of topology types that might be defined. More generally, topology types could be defined on an implementation specific basis:

direct connection;

a link with fixed delay with constant jitter;

a link with small and fixed amount of asymmetrical offset;

a link having a protection path that is of fixed delay, small constant jitter, and small asymmetrical delay;

a topology in which each network device is a network device that makes adjustments to timing packets to reflect delay introduced by the network device;

a topology in which each intermediate network device is a network device that makes adjustments to timing packets to reflect delay introduced by the network device. Intermediate network devices that make these adjustments are sometimes referred to as devices with boundary/transparent clocks;

a topology in which any network devices that make adjustments to timing packets to reflect delay are connected through direct connections;

a topology formed of network devices that are managed and controlled together with the master and slave by a common entity;

a topology in which no network device makes adjustments to timing packets to reflect delay introduced by the network device;

a topology providing a managed service (leased line, E-line) for which specific management information is available, for example information from a service level agreement, but for which control is by a separate entity. This management information may include information for a main path and/or a protection path;

a topology that is path performance bounded in terms of at least one of delay and jitter;

a topology for which there is no management visibility; and a topology for which there is no bounded performance, unknown paths and unknown protection capability.

In some embodiments, the communications path between the slave device and the master device includes a first communications path from the slave device 10 to the master device 12 and a second communications path from the master device 12 to the slave device 10. In some embodiments, the topology information comprises path asymmetry information reflecting an asymmetry in the first communications path versus the second communications path. In such embodiments, the path asymmetry information is used by the timing protocol module 18 in estimating the timing offset.

In some embodiments, the timing protocol module 18 itself determines an estimate of a path asymmetry from topology information received as part of a timing adjustment information 26. The timing protocol module 18 then uses this estimate of path asymmetry in estimating the timing offset.

It is to again be emphasized that the actual form that the timing adjustment information takes is implementation specific.

Adaptively Adjusting Acquisition of Delay Characteristics

In some embodiments, the timing packets are transmitted and received between the slave device 10 and the master device 12 on an ongoing basis. This might for example involve transmitting and receiving timing packets at a first frequency. After a change in the communications path between the slave device 10 and the master device 12 to a different communications path, the timing packets can then be transmitted and received more frequently in order to speed up the acquisition of delay characteristics for the different communications path. This may for example involve transmitting and receiving timing packets at a second frequency that is greater than the first frequency. As discussed below in the detailed examples of how the timing protocol module 18 may operate, in some embodiments the delay characteristics that are determined can be characterized as a moving average of the delay for a set of timing packets sent over some time interval. However, upon a change in communications path, there is no history upon which to create the moving average. As such, increasing the frequency of the transmission and receipt of the timing packets can allow for the moving average to converge on the correct value more quickly.

In some embodiments, the slave device 10 detects a change in path by receiving a notification of the change of path. This may for example form part of the timing adjustment information 26 received from the timing adjustment information server 14. However, the slave device 10 may alternatively receive a notification from some other source. In other embodiments, the slave device 10 is able to detect a change of path on its own by observing an out of bounds delay for one or more timing packets. For example, as a function of the timing adjustment information 26, the slave device 10 can determine limits on delays that can be experienced for timing packets transmitted and received between the slave device 10 and the master device 12. Should a packet be received with a greater delay than the limit thus determined, the slave device 10 can deduce that there must have been a change in path. Upon detecting such a change, the slave device 10 could then go ahead and increase the frequency of transmission and receipt of the timing packets as described above.

Timing Protocol Module

In some embodiments, the timing protocol module 18 is responsible for generating an estimate of the timing offset using the timing adjustment information and using the transmit and receive times for the transmitted timing packets and the received timing packets. In some embodiments, the timing protocol module 18 is responsible for generating an estimate of a fractional frequency offset using the timing adjustment information and using the transmit and receive times for multiple received timing packets. In some embodiments, the timing protocol 18 generates estimates of both the timing offset and the fractional frequency offset. In some embodiments, the timing protocol module 18 is further responsible for performing synchronization based on the timing offset thus determined. This may include time synchronization and/or frequency synchronization.

More generally, for phase/time synchronization the timing offset from the master is needed, and this is effected by master→slave delay and slave→master delay. On the other hand, for frequency synchronization, only the delay from the master to the slave effects frequency offset determination. Variations in the path from the master to the slave effect the frequency measurement, but the absolute value of the timing offset is not necessary.

Figure 2B:
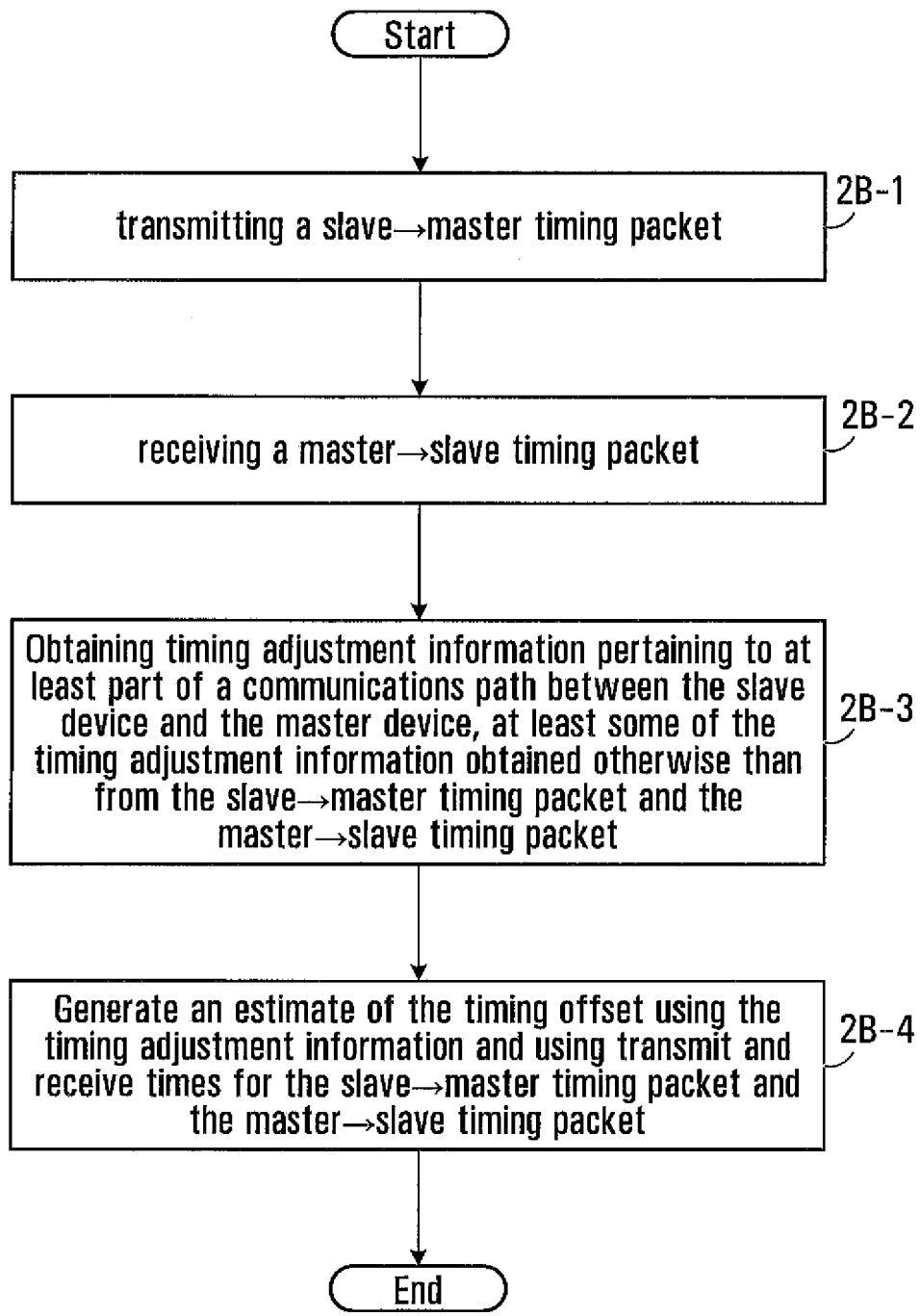
FIG. 2B is a flowchart of a method of estimating timing offset.

Referring now to FIG. 2B, shown is a method in a slave device for estimating a timing offset between the slave device and a master device. The method begins at block 2B-1 with the transmission of a slave→master timing packet. The method continues at block 2B-2 with receiving a master→slave timing packet. At block 2B-3, the slave device obtains timing adjustment information pertaining to at least part of a communications path between the slave device and the master device. At least some of the timing adjustment information is obtained otherwise than from the slave→master timing packet and the master→slave timing packet. Note also that the sequence of events described for blocks 2B-1, 2B-2 and 2B-3 is not necessarily as shown. For example, the timing adjustment information can be obtained at any time. In block 2B-4, the slave device can generate an estimate of the timing offset using the timing adjustment information and using the transmit and the receive times for the slave→master timing packet and the master→slave timing packet.

Figure 3:
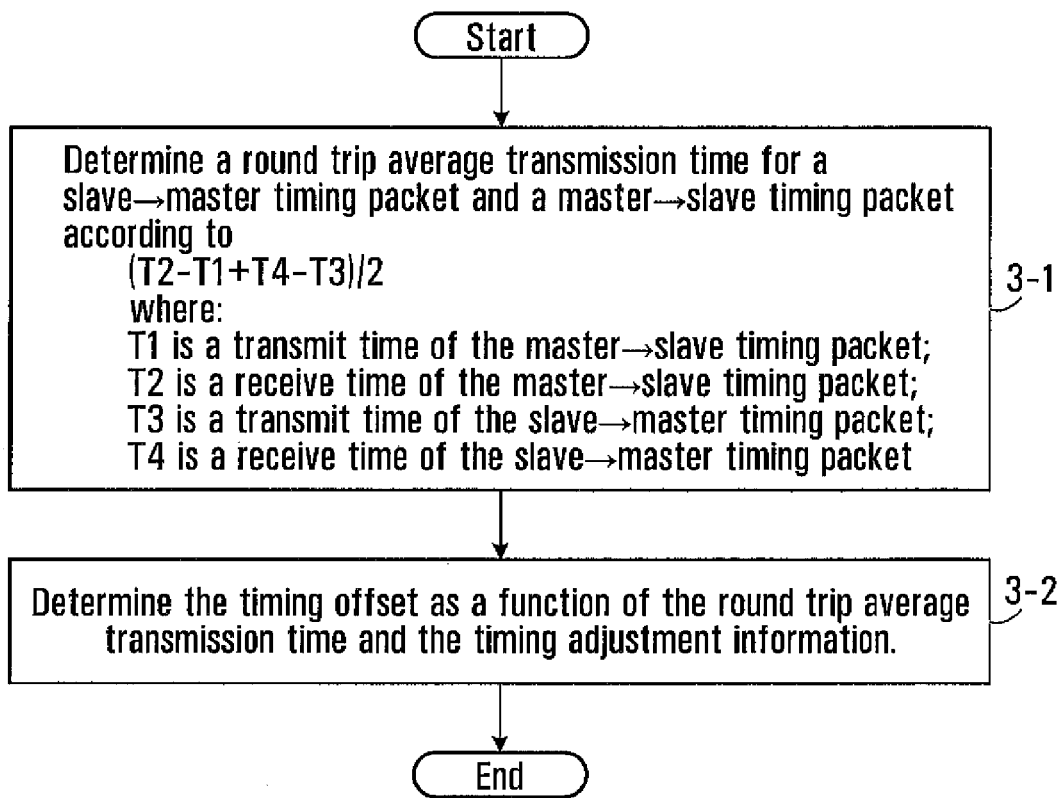
FIG. 3 is a flowchart of a specific example of how the estimate of the timing offset using the timing adjustment information might be performed.

With reference to the flowchart of FIG. 3, a specific example of how the estimate of the timing offset using the timing adjustment information might be performed will now be described. The method begins in block 3-1 with determining a round trip average transmission time for a slave→master timing packet and a master→slave timing packet according to $$(T2-T1+T4-T3)/2$$

where:

T1 is a transmit time of the master→slave timing packet;
T2 is a receive time of the master→slave timing packet;
T3 is a transmit time of the slave→master timing packet;
T4 is a receive time of the slave→master timing packet.

The method continues with determining the timing offset as a function of the round trip average transmission time and the timing adjustment information in block 3-2.

In some embodiments, determining the timing offset as a function of the round trip average transmission time and the timing adjustment information involves one or more of:

configuring a filtering algorithm as a function of the timing adjustment information; and configuring a clock discipline algorithm as a function of the timing adjustment information.

With further reference to FIG. 2A, in some embodiments, the communications path through network 16 between slave device 10 and master device 12 may include one or more devices that is/are already configured to make adjustments to timing packets to reflect delay. In a specific example, if the timing protocol being implemented is a PTP-1588V2 timing protocol, some network devices forming part of network 16 may be PTP-1588V2 compliant and make an adjustment to the "correction" field forming part of timing packets transmitted and received as part of the protocol. Given that these devices already have made adjustments to the timing packets to reflect delay introduced by those devices, there is no need for the timing protocol module 18 of the slave device 10 to make further adjustments for those devices. On this basis, in some embodiments, the timing adjustment information 26 that is obtained by the slave device 10 includes only timing adjustment information pertaining to network devices that are not already configured to make adjustments to timing packets to reflect delay. In some embodiments, the timing adjustment information component 14 maintains an awareness of which devices in the network 16 are configured to make adjustments to timing packets. In such embodiments, the timing adjustment information component 14 may then only send timing adjustment information 26 in respect of the remaining parts of the network 16.

In another example implementation, the timing adjustment information 26 is in respect of the complete network, including for one or more devices that are configured to make adjustments to timing packets to reflect delay. These might for example include PTP-1588V2 compliant devices for embodiments in which the timing protocol being implemented is PTP-1588V2. In such an embodiment, the timing protocol module 18 is configured to generate an estimate of the timing offset using only the timing adjustment information that pertains to network devices forming part of the communications path that do not already make adjustments to the timing packets to reflect delay.

Figure 2C:
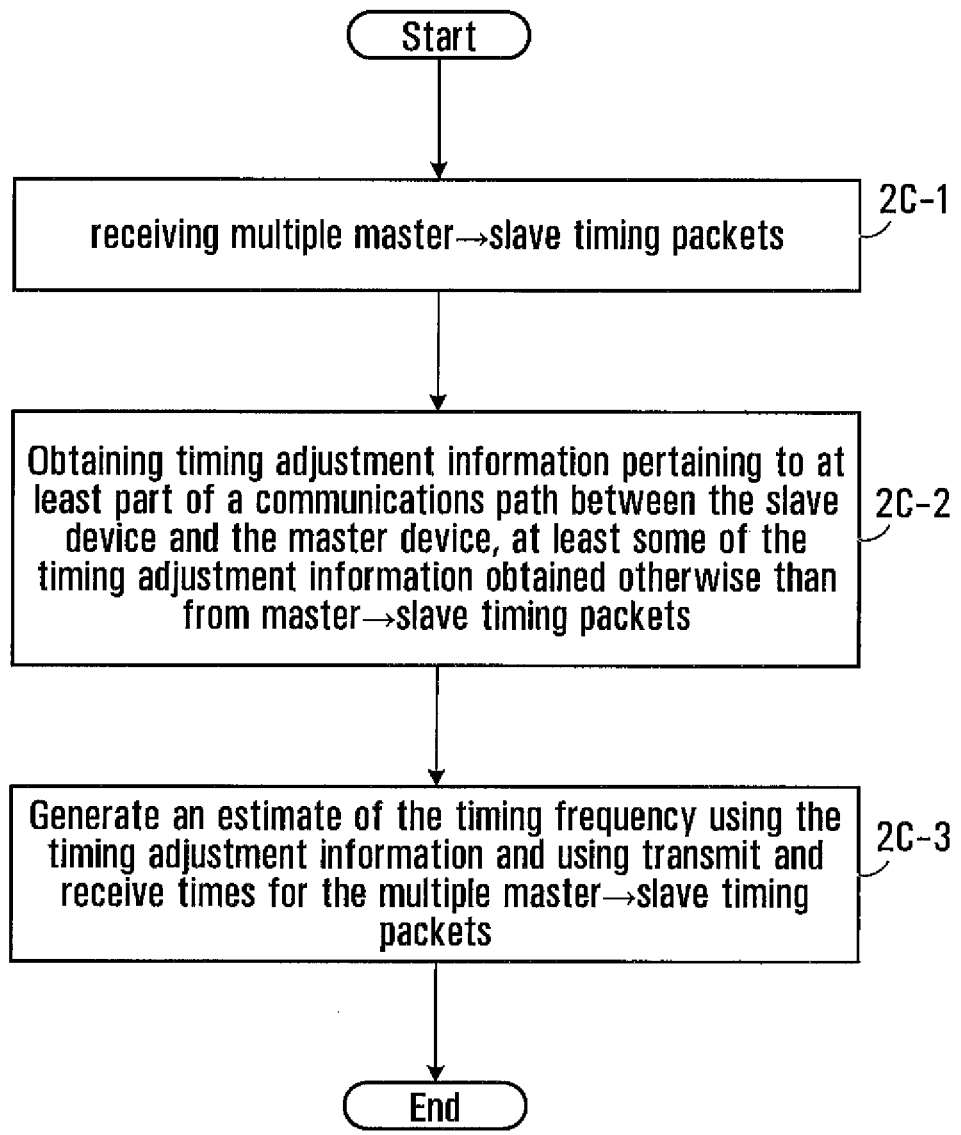
FIG. 2C is a flowchart of a method of estimating frequency offset.

Referring now to FIG. 2C, shown is a flowchart of a method of frequency offset estimation. The method begins at block 2C-1 with the receipt of multiple master-slave timing packets. The method continues at block 2C-2 with obtaining timing adjustment information pertaining to at least part of a communications path between the slave device and the master device, the timing adjustment information being obtained otherwise and from the master→slave timing packets. In block 2C-3, an estimate of the frequency offset is generated using the timing adjustment information and using transmit and receive times for the multiple master→slave timing packets.

Modelling of Communications Path—Network Device Types

In some embodiments, the communication paths between the slave device and the master device can also be modelled for the purpose of timing adjustment, and more specifically for the purpose of defining the timing adjustment information. This modelling can be done offline in a lab environment or with reference to network node specifications, or by a network management node that might also function as the timing adjustment information component in some embodiments.

Figure 4:
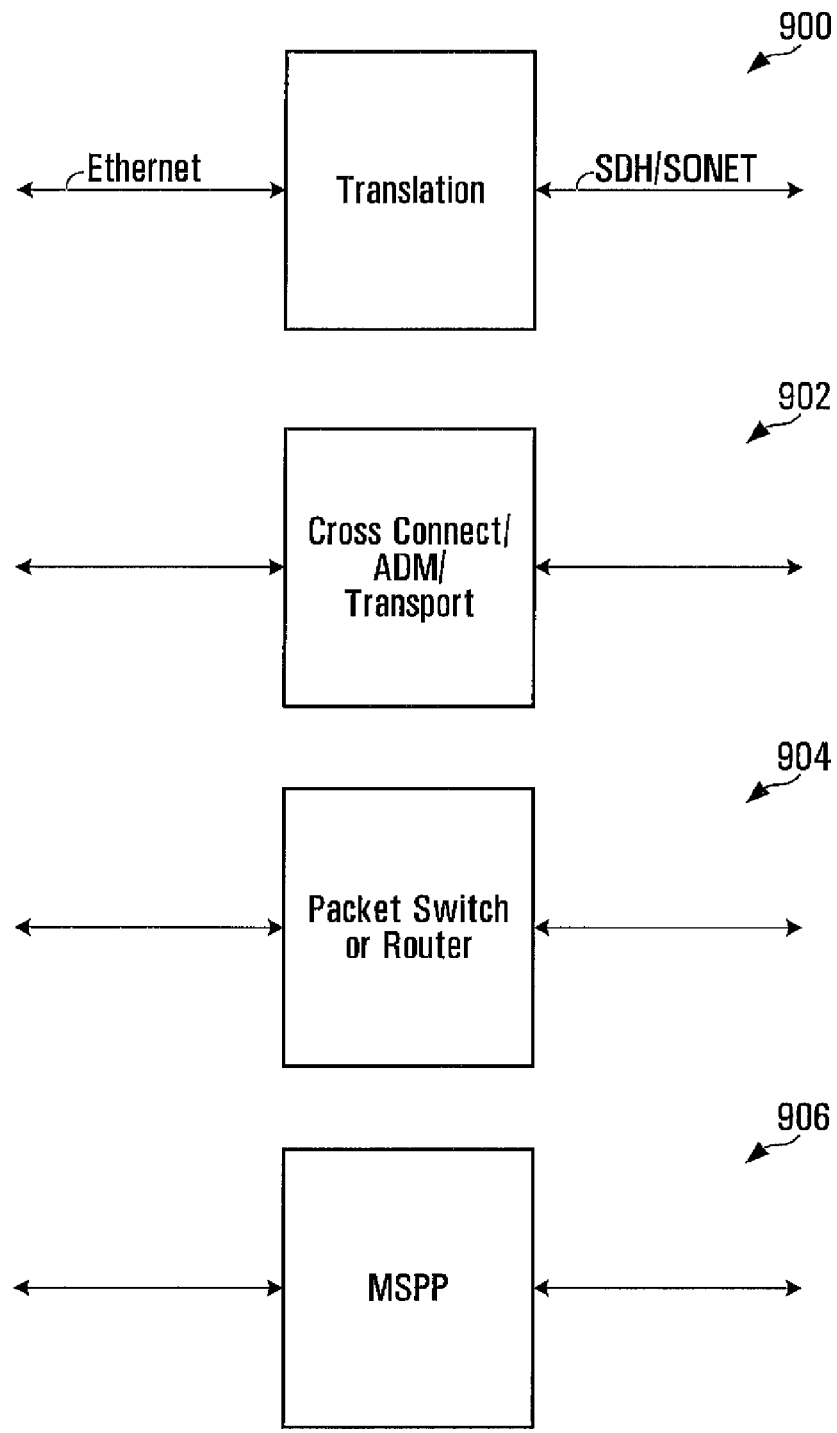
FIG. 4 shows an example of four different network device types that might be modelled for the purpose of timing adjustment.

With reference to FIG. 4, various network device types that may be modelled for the purpose of timing adjustment are shown. The first network device type is a translation network device 900 that performs a translation function. A specific example is a translation from/to Ethernet to/from SDH/Sonet. Such network devices can be characterized in terms of delay and jitter using EoS (Ethernet over Sonet) GFP (Generic Framing Procedure) Mapping, VC (virtual circuit) over SDH specified in ADM (Add-Drop Multiplexer). The second network device type is a cross connect or ADM or transport network device 902 that performs cross connection, ADM, or transport, for example between SDH/Sonet and SDH/Sonet. Such network devices can be characterized in terms of delay and jitter. The third network device type is a packet switching or routing network device 904 that performs a packet switching or routing function, for example between SDH/Sonet and SDH/Sonet. Such network devices can be characterized in terms of delay and jitter using the EoS portion from ADM. Also shown is an MSPP (Multi-Service Provisioning Platform) network device 906, although MSPP network devices can alternatively be modelled using the three network device types 900, 902, 904 referred to above.

Figure 5:
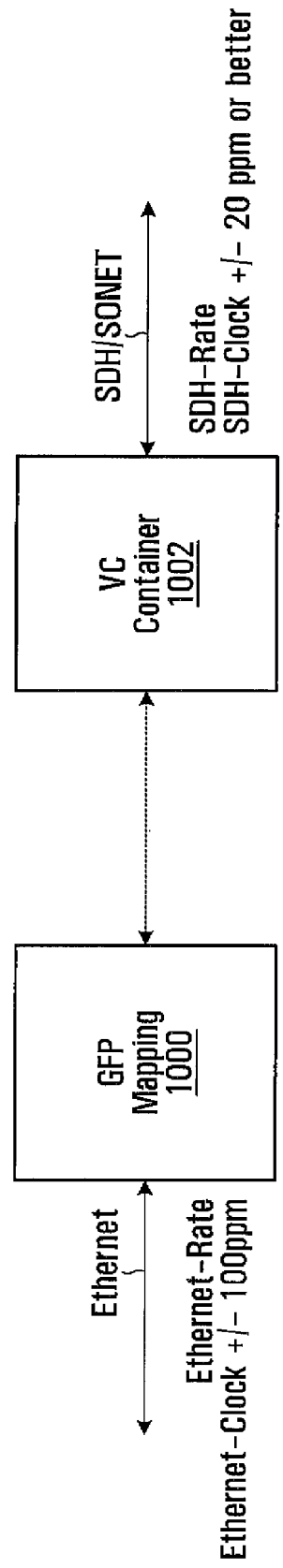
FIG. 5 is a schematic diagram showing further details of modelling of the network devices of the first type referred to in FIG. 4.

An example of the modelling of the first network device type will now be described with reference to FIG. 5. The translation network device is modelled as a GFP mapping 1000 and a VC container 1002. The input to the GFP mapping is Ethernet, having an Ethernet-Rate and Ethernet-Clock with a specified tolerance. The output from the VC container 1002 is SDH/Sonet having an SDH-Rate and SDH-Clock with specified tolerance.

Modelling of Communications Path—Another Example

In a particular example, for the purpose of timing adjustment, network devices can be classified as follow:
- links (fiber, copper, wireless channel, etc)
- network devices (switches, routers, ADM, etc);
- topologies (network devices connected by links).

Having modelled the path using the classification, the delay, maximum jitter, and topology changes can be defined based on:
- Links lengths (fiber or copper length);
- Links types (E1, T1, STM1, etc);
- Topology (how network devices are connected) specifically, the Main and protection paths (from master to slave and slave to master);
- Number of Network devices and their functions; and
- Protection event (i.e. topology change) and when it happens.

Links are fairly easy to characterize:
- the fixed delay is a function of the length;
- the asymmetrical length is typically specified by the manufacturer of the fiber or cable; and
- jitter is usually specified and typically small.

Network devices on the other hand can be a large contributor of jitter (delay variations). In an example classification of network devices, the following classification of network devices into three categories is provided:
- Transport (includes ADM, SONET/SDH, Optical Transmission OTN);
- Packet Network devices (Switches, Routers, etc); and
- Mixed Network devices (Network devices capable of doing transport functions and packets switching/routing functions).

Transport Network devices:

Transport network devices include for example legacy equipment such as SONET/SDH, and new transport OTN (Open transport network) network devices. Such equipment has very well understood delay, jitter behaviour, given that most of the functions these network devices perform (functions such as add, drop, multiplexing, mapping) have very controlled delay and jitter characteristics. Also, frequency synchronization is the norm in the SONET/SDH network devices who comply to these standards.

For example, a set of known characteristics of a SONET/SDH network device can be taken into account for the purpose of timing offset determination. The following is an example set of such characteristics:

Delay Requirements [GR-496-CORE]:
a) Maximum Delay are specified to be
   Non-Terminated, passed, dropped, etc: for STS/STM 25 μs (for VT~50 μs)
   Terminated: Asynchronous DSn 100 μs (for Byte Synch 100-375 μs)
b) Maximum Differential Delay (Virtual Concatenation)
   Payload Mapping: for STS-1-Xv/STS-3c-Xv 0.32 μs (for VT1.5Xv~10.00 μs)

Passing, Dropped, etc: for STS-1/STS-3c 5.00 μs (for VT1.5~20.00 μs)

c) Maximum Jitter: for STS/STM pointer Movement 0.16 μs (for DS1/E1 4.6/3.5 μs)

sSONET/SDH Network Performance
   Steady State: Normal operation with short period of stress
   Steady (Normal)
   1 pointer movement every 100s to once a day
   As many as 3 network wide "simultaneous" pointer movement
   Stress (Timing error "fps")
   These events happen from 1 to 100 times per day
   Equivalent to 7 successive pointer movements
   Holdover State
   Assuming a SMC (SONET Minimum Clock), there is a maximum of one pointer adjustment every 34 ms SONET/SDH paths are also provisioned (i.e. known before hand). When protection events, such as fiber cuts, happen, the new path is also known.

Summary of SDH Modeling Example
   Link Delay:
   Path Delay Main, Path Delay Protected
   N-elements
   Each Element has Normal/Holdover+/−0.16 us jitter per is sync interval
      ProbabilityOfNormal~1.096×10-6
      assuming 7 independent timing error once every 864s and 1× ptr movement every 100s;
      ProbabilityOfHoldover~3.676×10-3
   EoS Queue & Framing Delay Jitter
   also model:
      Failure (50 ms: drop probability)—Path switch
      Holdover and Steady Periods Packet Network devices:

Unlike transport network devices, packet network devices do not have well defined delay and jitter characteristics. Delays through a packet network device can be described as:

$$D_{total} = D_{fix} + D_{ind} + D_{tdp}$$

$D_{fix}$ is a fixed delay (called latency) to go from the input to the output of the network device. This delay does not vary with time or network conditions (it is a design parameter for the switch or router).

$D_{ind}$ is the delay that varies with time (stochastic), however this variation is independent of the traffic going through the network device. Typically, this type of delay variation is caused by quantization, multiple clocks inside the network device, processing time, etc.

$D_{tdp}$ is the delay that varies with time (stochastic) but is dependent on the traffic. It is typically due to queuing and scheduling. Traffic conditions that may effect this delay include:

Load (% of link that is used);
   Packet sizes; and
   Packet priority.

One can characterise a switch or router based on different traffic scenarios and establish:

$D_{fix}$ and $D_{ind}$ or mean $\{D_{ind}\}$ as a function of the switch/router type); and $D_{tdp}$ (as a function of the switch/router type and a set of traffic patterns and distribution).

In some embodiments, mean $\{D_{ind}\}$ is determined though characterization process, for example performed in a lab environment, for a given type of network device. This can be then a characteristic of a given network device that is included as part of the timing adjustment information.

In some embodiments, mean $\{D_{ind}\}$ is observed (measured in the field). This can, for example, be accomplished by measuring the delay variation in the absence of all other traffic, i.e. during periods of quiet. This method is less accurate because we can it cannot be determined for each network device individually, but rather is done for all the network devices in the path put together. A value for each network device can be estimated by dividing the overall mean by sqrt(N) where N is the number of network devices. This is due to the fact that $D_{ind}$ a is expected to have Gaussian behaviour (i.e. normal distribution). In some embodiments, in the absence of a quite period, this parameter will be estimated based on the "lowest traffic" period available. This value might then be adjusted if lower traffic periods become available.

Management software can provide periodic "reports" that determine the load, packet distribution, etc. for all ports in switches/routers (managed network devices).

Mixed Network Devices:

Some network devices can be considered to have behaviour that is a mix between that of a packet and a transport network device, and are referred to herein as "mixed network devices". Examples of mixed network devices include a mapper (for example Ethernet to SONET/SDH or EOS), or a complete SONET/SDH with a packet switch/router. These network devices have both characteristics of SONET/SDH plus packet mapping/processing.

One of the main mappings used in mixed network devices is EoS. Many EoS implementations use GFP-F (Frame Based) and implement a store and forward architecture. In such a mapping network device, the jitter depends on the traffic patterns as well as the implementation.

Modelling of the Communications Path—MSPP Example

It is again emphasized that the manner in which the communications path between the slave device and master device is modelled is implementation specific. A detailed example will be described with reference to FIG. 6.

Figure 6:
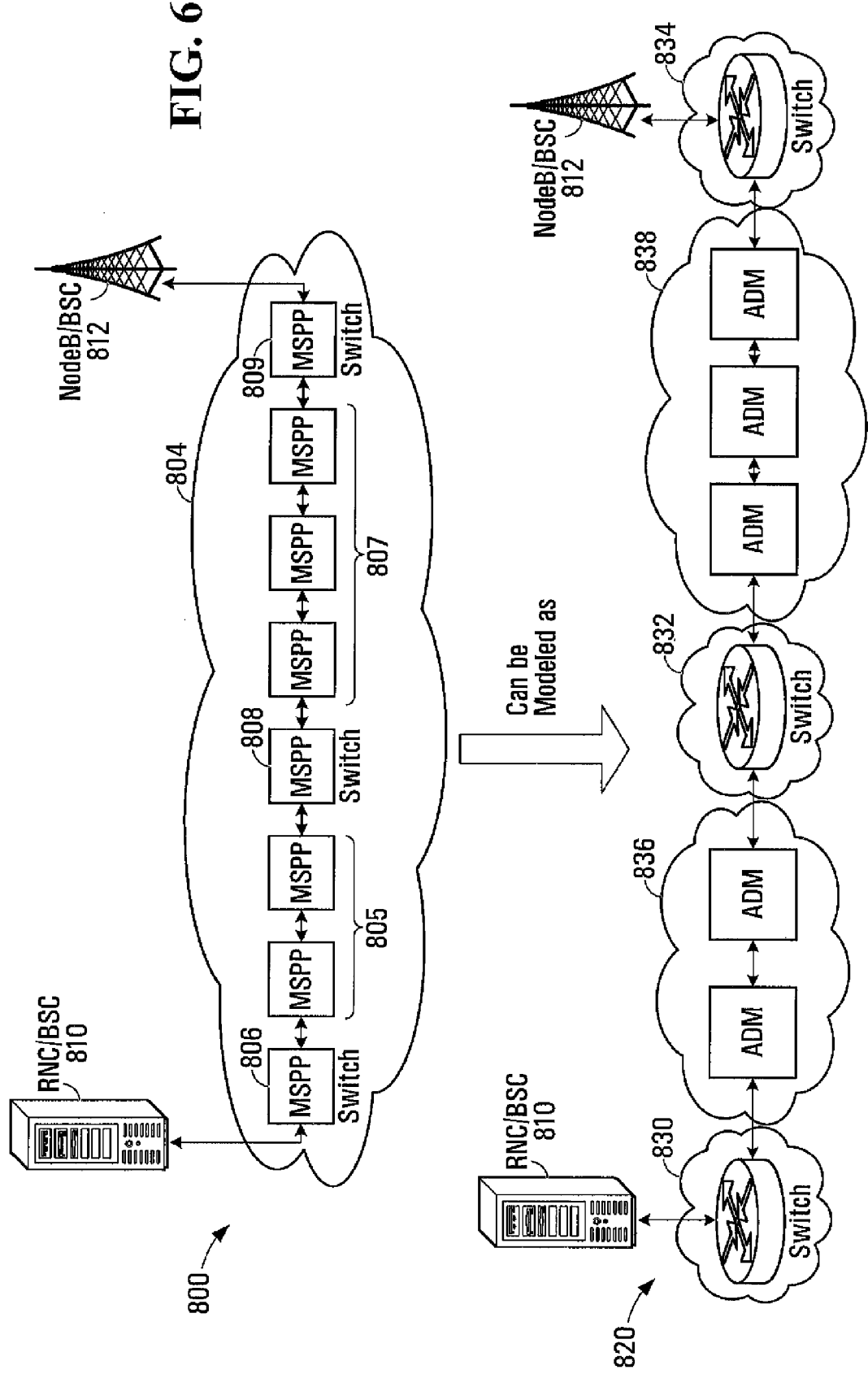
FIG. 6 is a schematic diagram of an example of an MSPP network.

FIG. 6 shows a schematic diagram of an example of an MSPP (multi service provisioning platform) network using an embodiment of the invention to synchronize timing information between an RNC/BSC (radio network controller/base station controller) 810 and a Network device B/BSC 812. Generally indicated at 800 is an MSPP network comprised of a set of MSPP network devices in cloud 804 some of which 806,808,809 are switching network devices. There is a set of network devices 805 (two in the illustrated example) between switching MSPP network devices 806,808 and there is a set of network devices 807 (three in the illustrated example) between switching MSPP network devices 808, 809. Also shown is an RNC/BSC (radio network controller/base station controller) 810 connected to switching MSPP network device 806, and a NodeB/BSC 812 connected to switching MSPP network device 809. For the specific example shown, it is assumed that the RNC/BSC 810 is the master device for the purpose of the timing protocol, and that the NodeB/BSC 812 is the slave device. The communications path between the master and the slave includes network nodes 806,805,808, 807,809. For the purpose of modelling the delay characteristics of the network, the network can be modelled using the model generally indicated at 820. The switching MSPP network devices 806,808,809 are modelled as switches 830,832, 834; the sets of MSPP network devices 805,807 are modelled as sets of ADMs (add drop multiplexers) 836,838. At the interface between the set of ADMs 836 and switch 832, an Ethernet to Sonet/SDH mapping is performed for downlink traffic and a Sonet/SDH to Ethernet mapping is performed for uplink traffic. Similar mappings take place at the other interfaces.

Use of the Timing Adjustment Information in Timing Offset Estimation

With further reference to FIG. 2A, as discussed above, the timing protocol module 18 in the slave device 10 estimates timing offset and/or frequency offset as a function of transmit and receive times for timing packets, and as a function of the timing adjustment information that is provided other than in those timing packets per se. Various examples of what the timing adjustment information might constitute have been provided above, and a particularly detailed account of how Sonet/SDH network devices might be modelled has also been provided. The specifics of how this information is then used by the timing protocol module 18 are implementation specific. In some embodiments, the timing adjustment information can be used in conjunction with timing packets to synchronize the time and/or frequency of the slave clock to the master clock. However, several detailed examples of how this might be used will now be provided.

Number of Network Devices:

By establishing the number of network devices in the communications path, the maximum amount of jitter, as well as the steady state (average jitter), can be determined.

Network Topology:

By knowing the topology, the failover path can be established, so when a failure occurs that can be taken into account.

Network Topology—Ring:

By knowing a ring topology (ring and how many hops in both directions), a bound on the asymmetrical path difference (difference between Master to Slave and Slave to Master) can be determined.

Topology Change Information:

By being kept informed of changes in topology, the slave device can update delays if there is a switch to a protection/alternate path. Also, the slave will be aware that a change in delay is not transient jitter but a new delay (path) that needs to be tracked. Certain parameters, such as the frequency of delay measurement can be increased in order to speed up acquisition of the new path, as described previously.

Delay Calculations:

Packet Delay Variation (PDV) is a way to measure jitter. It can be measured as the difference between the delay of sending two similar packets from the same source to the same destination. For example, in the case of PTP-1588V2, sync messages are sent from master to slave, and the PDV is the difference between the time it took two sync messages to arrive at the slave. The PDV (Jitter) can be characterized as:

A. Constant: roughly constant jitter, common causes are:
  Load Sharing, timing drift, etc;
B. Transient: (Spike) substantial change of PDV for a single (or a small) number of packets, common causes are:
  LAN Congestion, Scheduling Delay, Routes Updates, Route flapping, etc; and
C. Short Term Delay variations: change in delays that persists over a number of packets (period) and can also have varying PDV (jitter) in this period, common causes are:
  Link Congestion, router/switch overload, etc.

Detailed Example of Timing Offset Estimation Using Timing Adjustment Information A detailed example of how the slave may use the timing adjustment information to perform timing offset estimation will now be presented. To begin, assume the slave device has a sequence of delays from the master to the slave, calculated using the transmit and receive timestamps of master→slave timing packets as follows:

$d_0^{ms}, s_1^{ms}, d_2^{ms}, \ldots d_n^{ms}$ and that the slave device has a sequence of delays from the slave to the master, calculated using the transmit and receive timestamps of slave→master timing packets as follows:

$d_0^{sm}, s_1^{sm}, d_2^{sm}, \ldots d_n^{sm}$

The mean delay from the master→slave can be determined using a moving average of the delays from the master to the slave, for example by computing an average of the most recent N delays, where N is a parameter.

Using the timing adjustment information, the dispersion can be determined. Dispersion is a statistical measure of the range of delays. This can be represented by a minimum and maximum.

Figure 11:
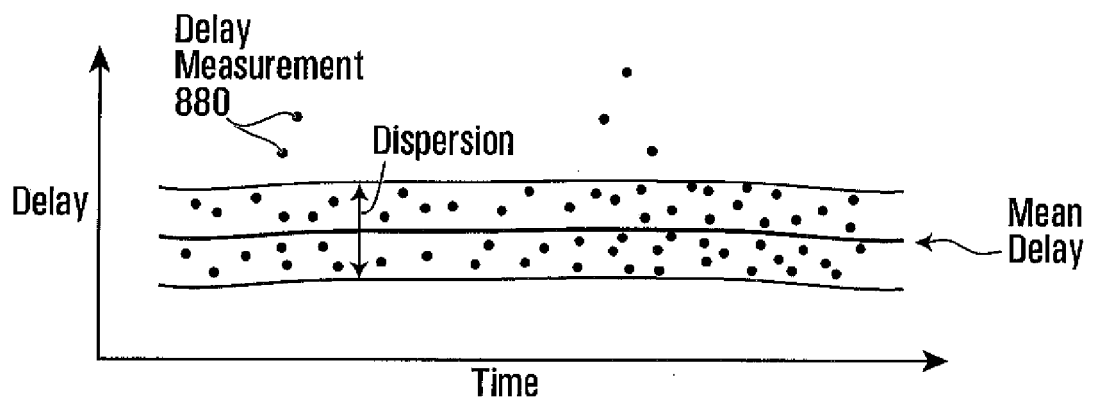
FIGS. 11, 12, 13 and 14 are graphical representations of examples of distributions of delays experienced by timing packets.

An example graphical depiction of a set of delays for steady state operation is provided in FIG. 11, including a mean delay and dispersion. In the normal course of events, in a first example of how the timing adjustment information can be used, the slave can be configured to ignore samples that are outside the dispersion. Thus, in FIG. 11, the delays 880 are ignored in computing the moving average.

Figure 12:
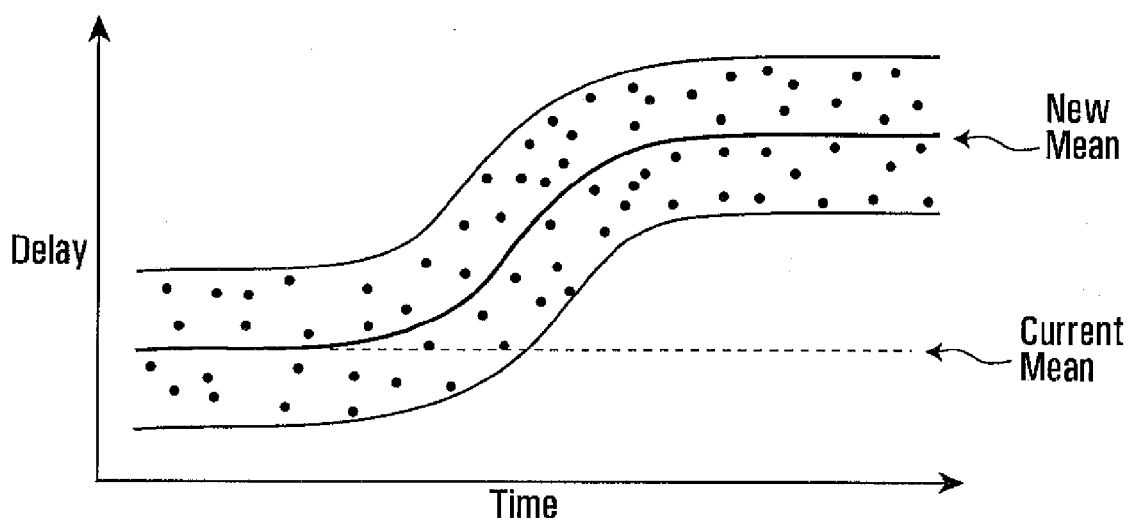
Figure 13:
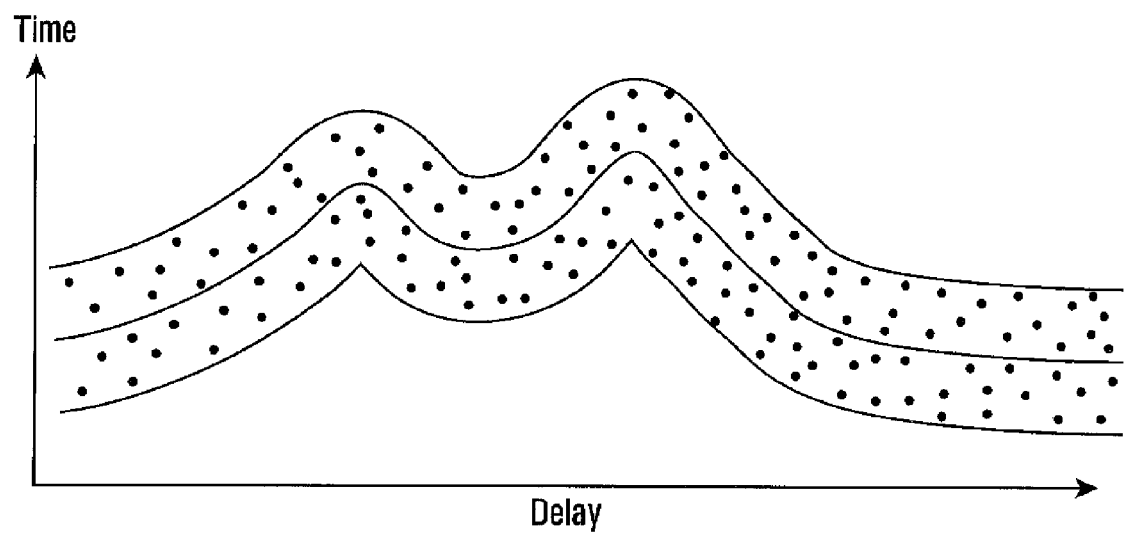

The delays may undergo a change in average, for example due to a topology change, or due to a sustained change in the delay through the network, for example due to sustained congestion. An example graphical depiction of a set of delays where there is a change in the mean that is assumed to occur as a result of a topology change is provided in FIG. 12. An example graphical depiction of a set of delays where there is a change in the mean that is assumed to occur as a result of sustained changes in delay due to congestion is provided in FIG. 13.

One way to deal with a change in the mean is to wait a time before applying a new mean. If this time is too small, then the wrong thing may be tracked, for example a sustained delay due to congestion. If the time is too large, the mean used may differ from the actual mean for too long. If there is no change in topology such as in the case of the FIG. 13 example, but there is a sustained change in delay, moving to the new mean will result in a large error as the new mean is tracked. This can be a large source of noise.

In a second example of how the timing adjustment information can be used, the slave can be configured to restart its moving averages and recompute its dispersion upon being notified of a change in topology (or equivalently after being notified of a change in the average and dispersion). In the absence of such a notification, the slave can ignore the samples that are outside the dispersion with the result that the mean does not change significantly for sustained changes due to congestion.

For the sake of example, assume a very simple network in which there is a single switch/router between the master and the slave. By knowing the load (for example as a percentage), packet sizes, and type of network device, an estimate of the delay through the network device can be generated. For example, if the load is 0-5%, packet size is <<any>>, and the switch is a layer-2 type "X", it might be determined that the average delay through the network device is 2 µs and that the dispersion is 0.3 µs. A management network device (more generally any timing adjustment information component) can either forward this delay information as the timing adjustment information, or the management network device can forward the load, packet size, and type information to the slave. In the latter case, the slave is configured to be able to determine delay from such information. In the absence of a path change, the thing that is most likely to change is the load, so in some embodiments, the management network device sends a notification to the slave of the load on a periodic basis. This indication might be an indication of one of a plurality of load ranges within which the actual load falls.

Figure 14:
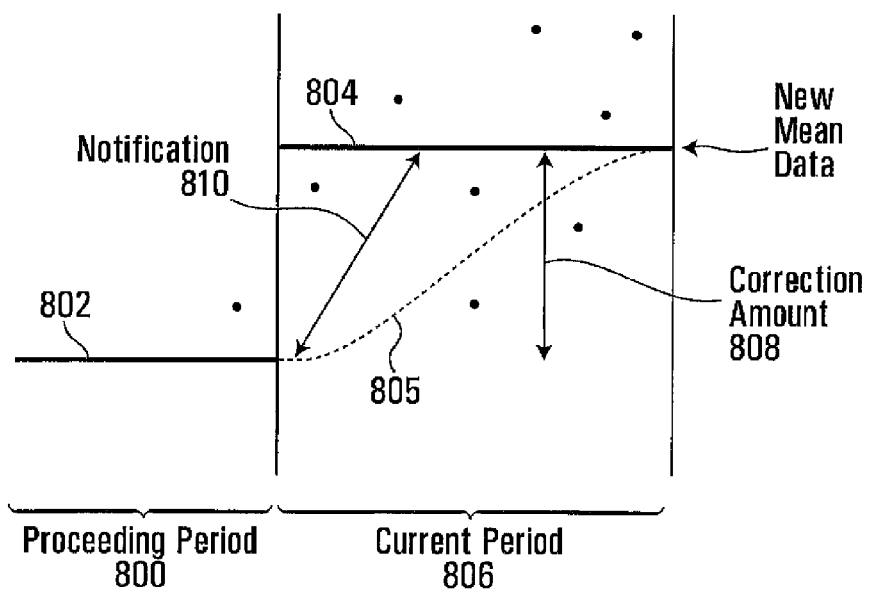

FIG. 14 is another example of a set of delays. For a preceding period 800, there is a mean delay 802. During a current period 806, the mean over the entire period increases to the mean delay 804. However, even if the change was due to an abrupt change in conditions, such as a change in topology, the mean computed in the slave device would gradually increase from mean delay 802 to mean delay 804 due to the moving average operation, as indicated at 805. Because of this, initially at least, there would be a large error between the mean delay determined using the moving average operation, and the actual mean delay. In some embodiments, the timing adjustment information is used to correct for this. Instead of using the new delays (those received during the current period 806) to change the mean delay, resulting in a determination of mean delay as indicated at 805, an estimate of a "correction" term representing an estimated delay is made, taking into account received timing adjustment information such as a topology update or congestion notification. Then, new delay samples can be expressed in the form of:

$D_i$=current mean delay+"estimated correction"+error

This can result in a significant reduction in the amount of error.

In some embodiments, a weighted averaging approach is employed in which each delay determined according to the above equation is given a weight that is representative of the reliability of the accuracy of the delay. In a specific example, weights can be assigned according to the level of activity. For example, if a delay was measured in a period of low activity, for example 0-5% load, then the weight given to the delay is high, for example close to a 1. If the delay was measured during a period of high activity, for example 95% to 100%, then the weight given to the delay is low. If the delay is outside the dispersion, the error term for the delay is given a weight of zero. These weighted delays can then be used to update the mean delay and dispersion. For example, a new mean delay can be determined according to:

$$\text{new\_mean\_delay} = \frac{(\text{mean\_delay} + \text{weight\_delay})}{\text{total weight}}$$

where total weight = previous_total_weight + weight

Timing Offset Adjustment

For timing offset estimation, a mean delay from the master to the slave $D^{ms}$, and a mean delay from the slave to the master $D^{sm}$ are tracked in this manner. A new timing offset can then be determined according to:

timing_offset_new=½($D^{ms}$+$D^{sm}$)

In some embodiments, the new timing offset is not applied directly, but rather further filtering of the timing offset thus computed is applied. For example, define a timing_offset_correction as follows:

timing_offset_correction=timing_offset_new−timing_offset_previous

Then, in some embodiments, the timing_offset_correction values thus determined are filtered, for example using a proportional integrator approach, and the filtered value is applied to generate a timing offset that will actually be applied in performing timing synchronization. Filtering of the timing_offset_correction values is a specific example of filtering the timing offset.

Fractional Frequency Offset Adjustment–FFO Determination in the Slave Device

Recall that Fractional Frequency Offset (FFO) (or drift) can be expressed as follows:

(FO−FR)/FR→FFO=($T^s$+$T^m$)/$T^m$ where $T^s$ and $T^m$ are determined across iterations according to:

$$T_0^m = t_1^a - t_0^a = \text{Delta\_M}$$

$$T_0^s = t_1^b - t_0^b = \text{Delta\_S}$$

$$FFO = (\text{Delta\_S} - \text{Delta\_M})/\text{Delta\_M} = (\text{Delta\_S}/\text{Delta\_M}) - 1$$

rearranging,

Delta_S=Delta_M*(1+FFO)

This means that the time at the slave is really the time at the master*(1+FFO). Thus, it is important to factor in that time measured at the slave and at the master are always different (by 1+FFO), even if the exact same "period" is measured. Now using the time-stamps and realistic delays define:

($t^b_1$−Delta_S)==(Delta_M=$t^a_1$−$t^a_0$)+{D1−D0} where {D1−D0} is a the difference in the period measured by the slave compared to that of the master, and where D0 is the master to slave delay for the first timing packet, and D1 is the master to slave delay for the second timing packet. D0 and D1 can be expressed as follows, where DMS=the current mean delay from the master to the slave updated using the methods described above for timing offset estimation, taking into account the timing adjustment information:

D0=DMS+D_err0;

D1=DMS+D_err1 from which D_erro0 and D_err1 can be determined by the slave according to:

D_err0=D0−DMS

D_err1=D1−DMS=

==>Delta_S=Delta_M+(D_err1−Derr0)

Using both equations this can be re-written as follows:

(Delta_S−Delta_M)/Delta_M=FFO_previous+
(D_err1−Derr_0)/Delta_M

The frequency offset correction can be seen to be the amount (D_err1~Derr_0)/Delta_M. In some embodiments, this amount is not directly applied to generate a new FFO. Rather, some filtering is applied, for example a proportional integration, and the filtered values are used for actual frequency synchronization.

It should be understood that a very specific method of updating the FFO has been described. More generally, the FFO is updated as a function of the mean master slave delay, the mean master-slave delay having been determined taking into account the timing adjustment information.

Timing Adjustment Information Component

Figure 16:
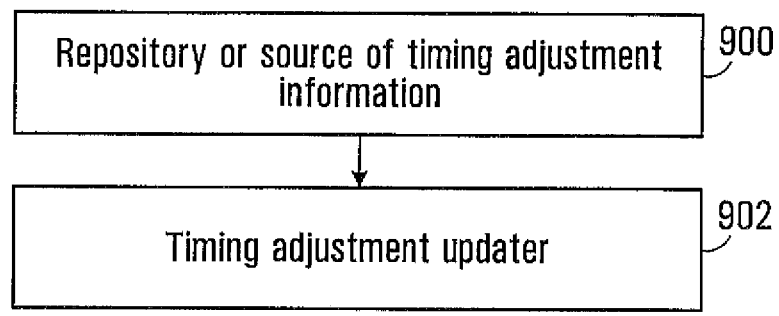
FIG. 16 is a block diagram of a timing adjustment information component.

FIG. 16 is a block diagram of an example implementation of the timing adjustment information component 14 of FIG. 2A. The component includes a repository or source of timing adjustment information 900. The timing adjustment information that may, for example, be of any of the types described herein. Also shown is a timing adjustment updater 902 that transmits updates of the timing adjustment information to the salve device for use in at least one of time synchronization and frequency synchronization. In some embodiments, the timing adjustment information component is a separate device on the network from both the slave device and the master device. In some embodiments, the timing adjustment information component is implemented as part of another network device such as a network management device.

Working with Non-Compliant Devices

Some network devices may be compliant with a timing protocol in the sense that the network device itself receives timing packets and performs adjustments to the packets to reflect delay introduced by the network devices and then forwards the timing packets on to the next element in the network. Another embodiment of the invention provides a method of operating a network device that would nominally be non-compliant in such a manner that it behaves as though it were compliant.

Figure 7:
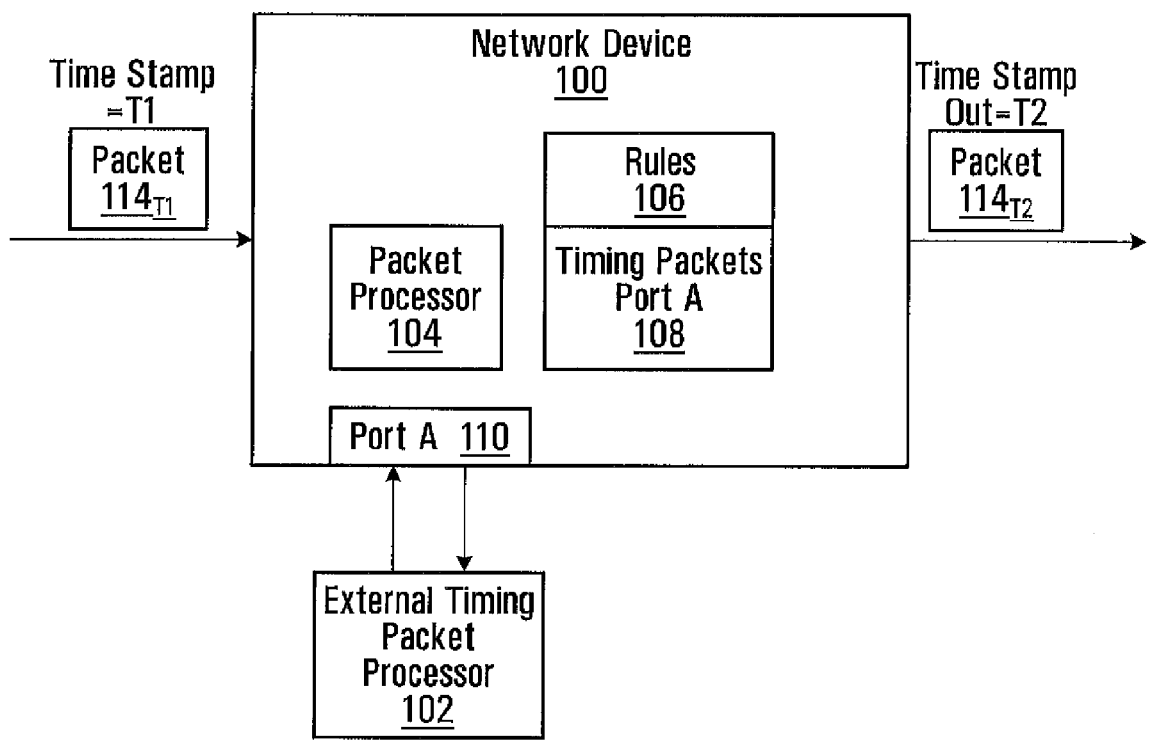
FIG. 7 is a schematic diagram of a network device with an external timing packet processor.

Referring now to FIG. 7, shown is a block diagram of an apparatus that implements such a method. Shown is a network device 100 connected to an external timing packet processor 102. The network device 100 may be any network device that performs forwarding of packets along a communications path. The network device has a packet processor 104 which processes packets using one or more rules 106. In the particular example illustrated, one of the rules 106 is rule 108 which requires that any timing packets received by the network device 100 be directed to $Port_A$ 110. $Port_A$ 110 is a specific port that has been designated for the processing of the timing packets. It can be seen that the external timing packet processor 102 is connected to the network device 100 through $Port_A$ 110. An incoming packet at time T1 is indicated at $114_{T1}$. Time T1 is the time of receipt of the packet by the network device 100. The exact definition of the time of receipt is application specific. In some embodiments, it is defined as the time of receipt of the first byte of the packet by the network device 100. Also shown is the same packet at a later time T2 indicated as packet $114_{T2}$. The exact definition of the time of transmission is application specific. In some embodiments, the time T2 is defined at the time that the last byte of the packet leaves the network device 100. It is noted that the times T1 and T2 are not known. This will be described in further detail below in the discussion of how the external timing packet processor 102 operates. Typically, the external timing packet processor 102 is part of an external device that is connected to the network device through an interface for plugging the external device into the network device.

Figure 8:
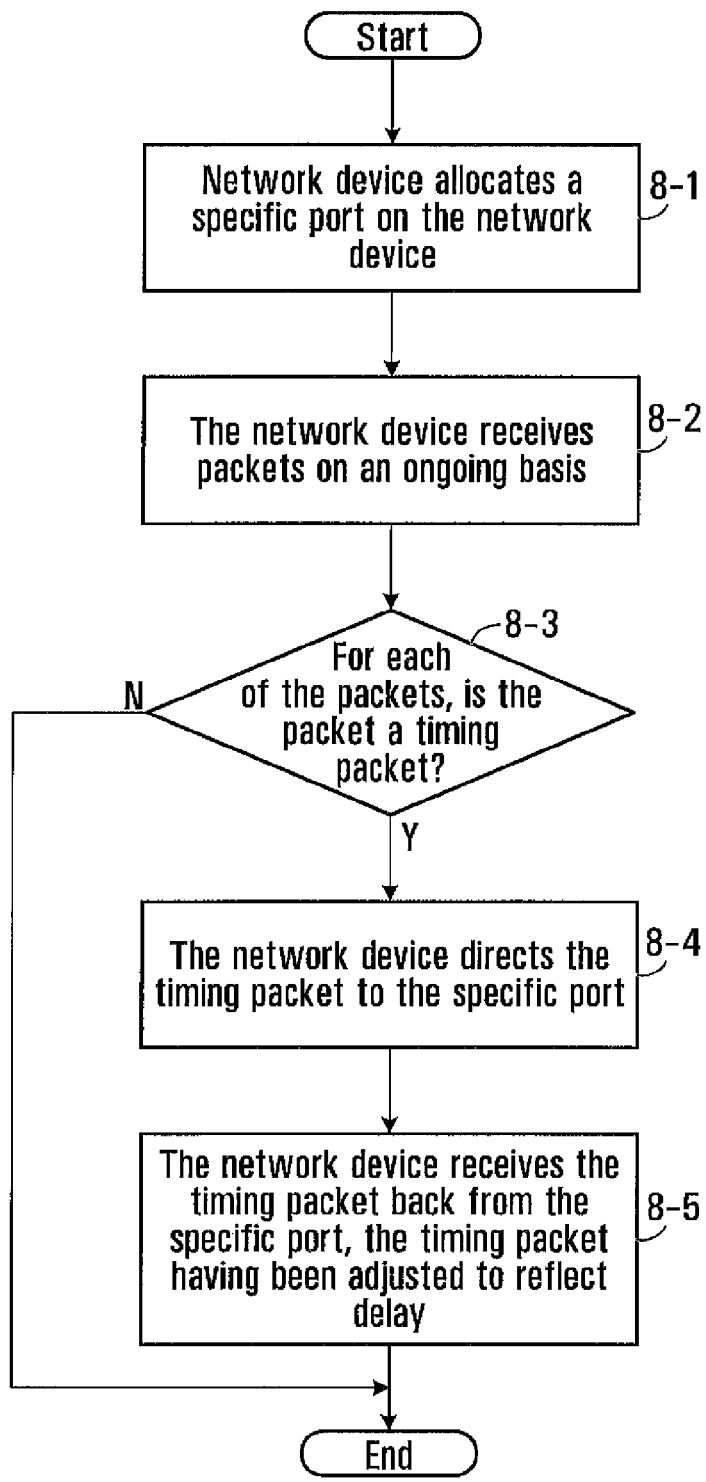
FIG. 8 is a flowchart of a method of processing timing packets in a network device in which all timing packets are sent to a specific port.

The operation of the network device 100 will now be described with further reference to the flowchart of FIG. 8. The method begins at block 8-1 with the network device 100 allocating a specific port on the network device for the processing of timing packets. In block 8-2, the network device, on an ongoing basis, receives packets. The network device processes each packet in accordance with the rules 106. In the event that a given packet is a timing packet, yes path block 8-3, then the network device 100 directs the timing packet to the specific port at block 8-4. Later, at block 8-5, the network device 100 receives the timing packet back from the specific port, the timing packet having been adjusted to reflect delay introduced by the network device 100. It can be seen that if the packet is not a timing packet, then blocks 8-4 and 8-5 are not executed.

In some embodiments, for each packet that is received by the network device, the network device determines if the packet is a timing packet by looking at a type field of each received packet.

Figure 9:
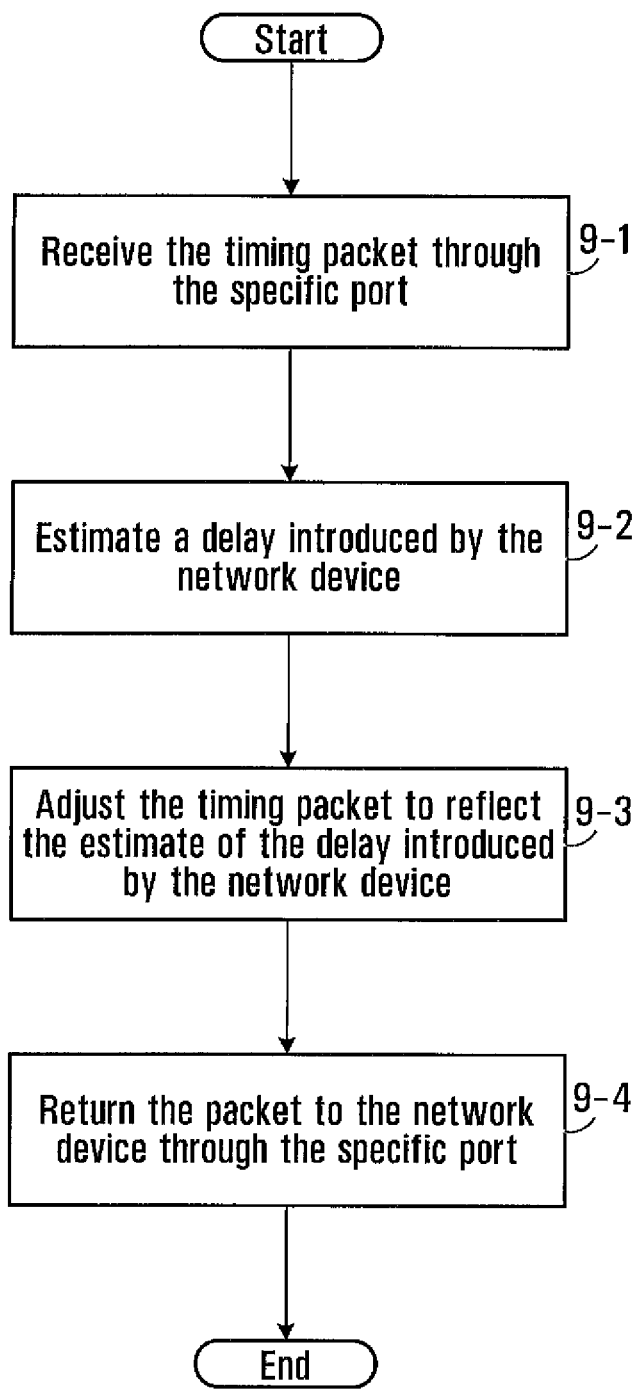
FIG. 9 is a flowchart of a method of processing timing packets in an external timing packet processor.

Referring now to FIG. 9, the operation of the external timing packet processor 102 will be described. In block 9-1, the external timing packet processor 102 receives a timing packet through the specific port. At block 9-2, the external timing packet processor 102 estimates a delay introduced by the network device 100. At block 9-3, the external timing packet processor 102 adjusts the timing packet to reflect the estimate of the delay introduced by the network device. Finally, in block 9-4, the external timing packet processor 102 returns the adjusted timing packet to the network device 100 through the specific port.

In some embodiments, adjusting the timing packet to reflect the estimate of the delay introduced by the network device involves increasing a field in the timing packet by the estimate of delay introduced by the network device. For example, in some embodiments the timing packet is a PTP-1588V2 precision timing protocol packet having a correction field, and the correction field is increased to reflect the estimate of the delay that is introduced by the network device. The delay introduced by the network device can also be referred to as the residence time.

Figure 10:
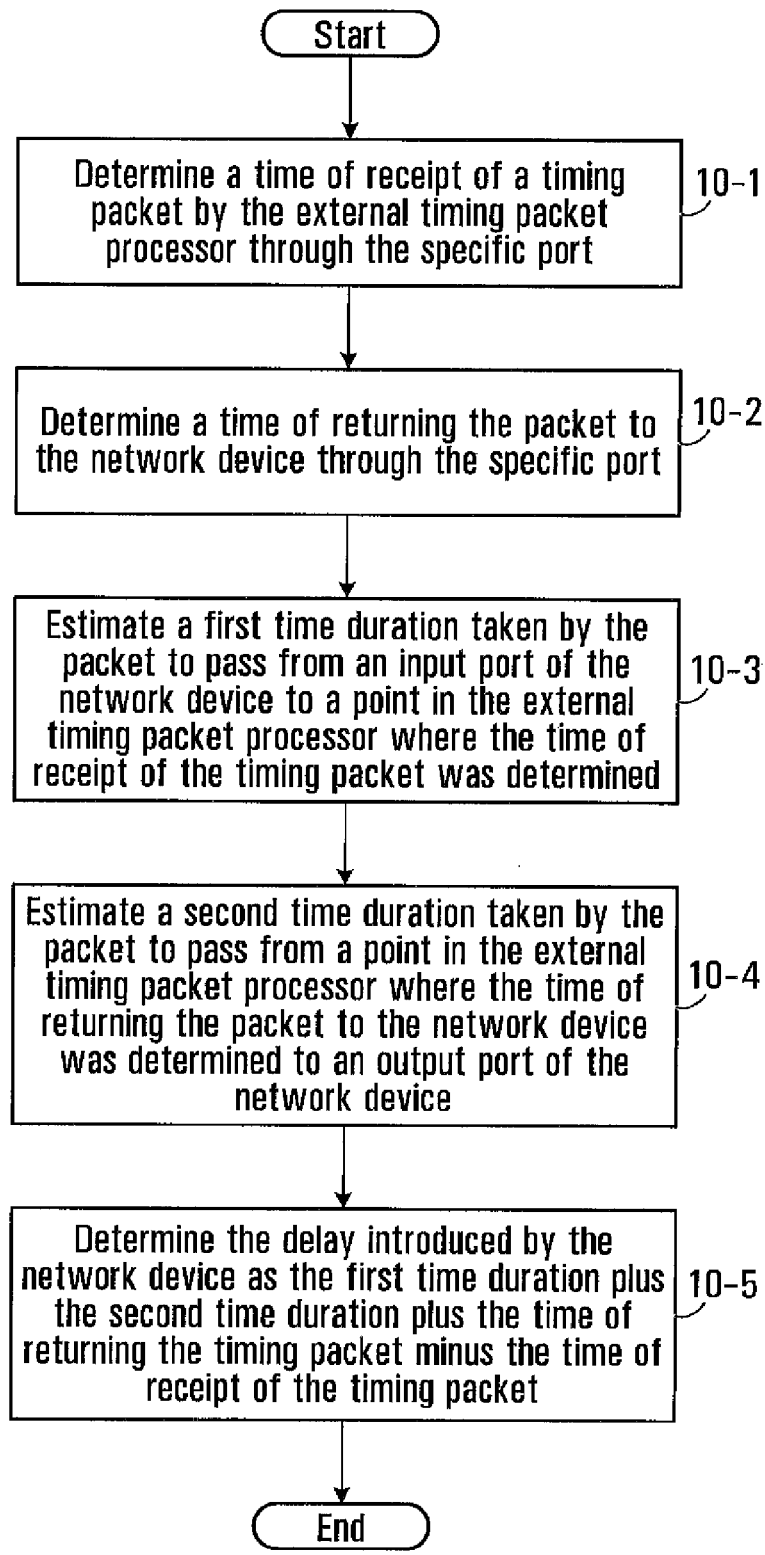
FIG. 10 is flowchart of a method of determining delay introduced by a network device.

Referring now to FIG. 10, shown is a flowchart of an example method of estimating the delay introduced by the network device. The method begins at block 10-1 with determining a time of receipt of the timing packet by an external device through the specific port. The method continues at block 10-2 with determining a time of returning the adjusted timing packet to the network device through the specific port. The method continues at block 10-3 with estimating a first time duration taken by the packet to pass from an input port of the network device to a point in the external timing packet processor where the time of receipt of the timing packet was determined by the external timing packet processor. The method continues at block 10-4 with estimating a second time duration taken by the packet to pass from a point in the external timing packet processor where the time of returning the packet to the network device was determined by the external timing packet processor to an output port of the network device. Finally, the delay introduced by the network device is determined in block 10-5 as the first time duration plus the second time duration plus the time of returning the timing packet minus the time of receipt of the timing packet.

Assuming that the packet $114_{T1}$ is a timing packet, then let the time of receipt of the timing packet by the external timing packet processor 102 be $T_A$, and let the time of returning the packet to the network device be $T_B$. Then, the so-called "first time duration" referred to in the flowchart described above is $D_1 = T_B - T1$ and the second time duration $D_2 = T2 - T_B$. A third component of the delay is the amount $T_B - T_A$. The third component can be determined precisely by the external timing packet processor 102 since $T_B$ and $T_A$ are known. However, as described previously, T1 and T2 are not known by the external timing packet processor 102. As such, these values need to be estimated.

$D_1$ and $D_2$ are similar to a generic delay and can each be modelled according to:

$$D_1 = D_{1,fix} + D_{1,ind} + D_{1,tdp}$$

$$D_2 = D_{2,fix} + D_{2,ind} + D_{2,tdp}$$

where $D_{i,fix}$ is a fixed delay that is known, $D_{i,ind}$ is a traffic independent delay, and $D_{i,tdp}$ is a traffic dependent delay. The estimate of $D_{i,tdp}$ can be updated on an ongoing basis having regard to locally obtained timing adjustment information, for example, knowledge of the load and packet length information for the particular network device.

In some embodiments, the residence time is determined as follows:

$$\text{residence time} = D_{1,fix} + \text{mean}\{D_{1,ind}\} + D_{1,tdp} + D_{2,fix} + \text{mean}\{D_{2,ind}\} + D_{2,tdp}$$

and the correction field can be updated according to:

$$\text{new correction field} = \text{previous correction field} + \text{residence time}.$$

In some embodiments, mean$\{D_{ind}\}$ is determined though characterization process, for example performed in a lab environment, for a given type of network device.

It is to be understood that this is a specific example of how timing packets can be adjusted to reflect delay. Other methods are possible.

External Pluggable Device Embodiment

Figure 15A:
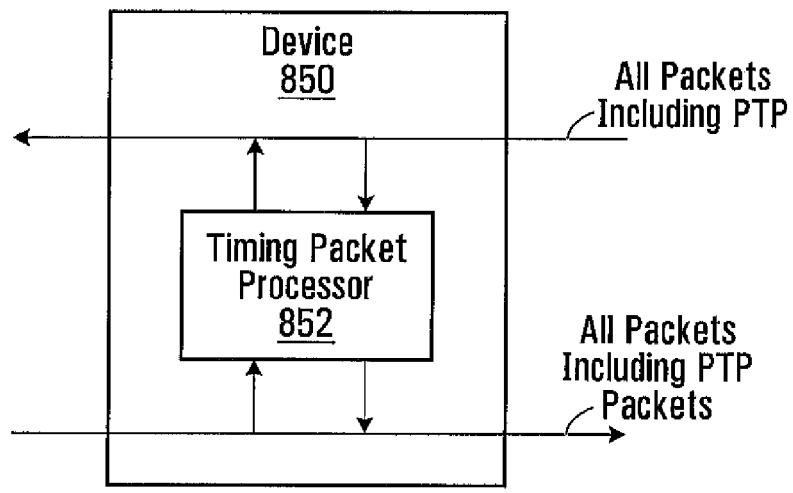
FIGS. 15A and 15B contain two examples of modules containing external timing packet processors.
Figure 15B:
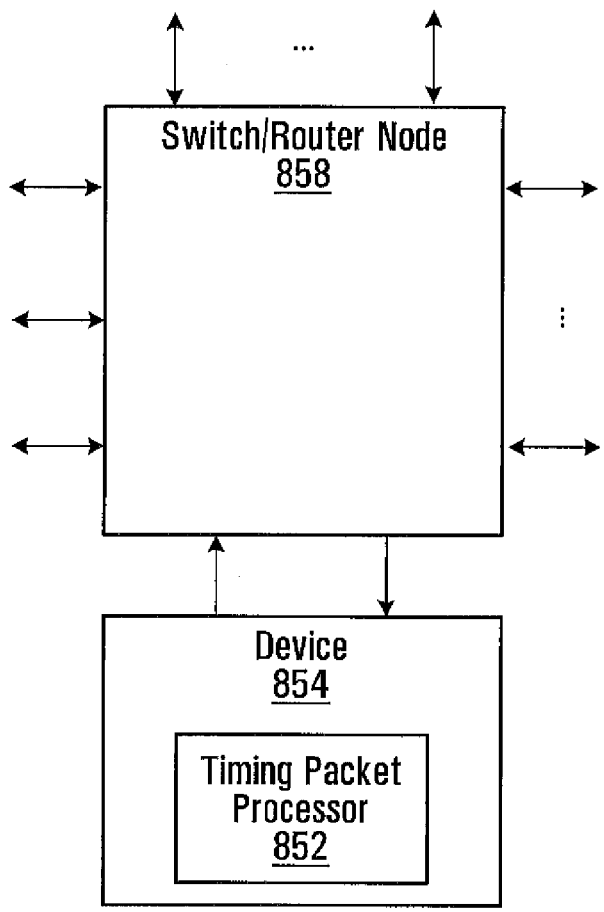

Another embodiment provides an external pluggable device containing an external timing packet processor that is responsible for updating timing packets to reflect delay introduced by a network device. The external timing packet processor 102 of FIG. 7 is an example of this. Two examples of such a device are depicted in FIGS. 15A and 15B.

In the first example (FIG. 15A), a device generally indicated at 850, is connected in a pass through manner to a network device (not shown) that does not update packets to reflect delay. The device 850 is configured to pass all timing packets to a timing packet processor 852 that is responsible for estimating the residence time of the timing packet, and updating the timing packet accordingly, for example by adding the residence time to a correction field as described previously. The device is connected in a pass through manner to a particular port of a network device 858 that does not update packets to reflect delay. Incoming packets to the device that are addressed to the particular port of the network device 858 are received first by the device since it is connected in a pass through manner. The packets are examined to see if they are timing packets. Each timing packet is adjusted to reflect delay introduced by the network device. The incoming packets are then forwarded on to the particular port for normal processing by the network device. Similarly, outgoing packets of the device that are addressed to the particular port of the network device 858 are output by the particular port and then examined by the device to see if they are timing packets. If they are, then the timing packets are adjusted to reflect delay introduced by the network device. The outgoing packets are then output as though they had been output by the particular port. In addition, the network device 858 is configured to forward all timing packets received on any other port to the particular port where the timing packets are adjusted. Rather than outputting these in a flow through manner as done for packets input to/output from the particular port in the first place, the device turns these packets around and returns them to the network device 858 which then processes them in a normal manner.

In the second example (FIG. 15B), a device generally indicated at 854, is connected to a particular port of a network device 858 that does not update packets to reflect delay. The network device 858 is configured to forward all timing packets to the particular port. The device has a timing packet processor 856 that is responsible for estimating the residence time of the timing packet, and updating the timing packet accordingly, for example by adding the residence time to a correction field as described previously.

It can be seen that for most traffic, the behaviour of the second example is the same as the first example. The exception is that traffic received/output by the particular port is processed by the device in a flow through manner. This has the advantage of not requiring a port to be dedicated solely to the function of performing timing packet adjustment. When there are not many ports, this is particularly advantageous.

Embodiments have been described in which a slave device uses timing adjustment information to estimate timing offset and/or fractional frequency offset. At least some of the timing adjustment information is obtained otherwise than from the timing packets themselves.

In some embodiments, additional timing adjustment information that is obtained from the timing packets themselves is considered by the slave device in estimating the timing offset and/or fractional frequency offset. Specifically, some devices in the communications path may be configured to make adjustments to the timing packets to reflect delay. These could include devices that are compliant with a particular timing protocol by themselves such that they make adjustments to the timing packets on their own. These could also include devices that are not on their own compliant with a particular timing protocol, but which are equipped with an external timing packet processor as described above.

In some embodiments, the slave device then takes into account both the timing adjustment information contained in the timing packets themselves, and the timing adjustment information received otherwise than from the timing packets. Typically, the timing adjustment information from the timing packets themselves would be in respect of network devices that are compliant with the timing protocol and/or in respect of network devices that include the external timing packet processor. A specific example of this is the "correction" field that is included in a PTP-1588V2 timing packet. Upon receipt by a slave device, this will contain a cumulative adjustment made by all compliant network devices should any be present, and all network devices equipped with an external timing packet processor should any be present. Typically, the timing adjustment information received otherwise than from the timing packets themselves would be in respect of network elements that are neither compliant with the timing protocol, nor equipped with external timing packet processors. There may be a mix of network devices that are fully compliant, that are equipped with external timing packet processors, and that are neither compliant nor equipped with external timing packet processors. In some embodiments, the effect of the timing adjustment information received in the timing packets can be factored in using conventional methods. For example, for FTP-1588V2 timing packets containing a correction field, this can be factored in by the slave device in the conventional manner.

Another embodiment provides a network device equipped with a timing protocol module that is configure to transmit a slave-*master timing packet and to receive a master-slave timing packet. The timing protocol module also is configured to obtain receive a topology update pertaining to at least part of a communications path over which the slave→master timing packet was transmitted and the master→slave timing packet was received indicating a change to the communications path. This might for example occur when a protection event occurs. The timing adjustment module then generates an estimate of a timing offset using the topology update and using transmit and receive times for the slave→master timing packet and the master→slave timing packet and/or generates an estimate of a fractional frequency offset using the topology update and using transmit and receive times for multiple master→slave timing packets. Methods of how this can be done have been detailed above. In some embodiments, the network device is further configured to increase a speed of transmission of slave→master timing packets and receipt of a master→slave timing packets upon receipt of the topology update to increase a speed of acquisition of delay characteristics.

Numerous modifications and variations of the present invention are possible in light of the above teachings. It is therefore to be understood that within the scope of the appended claims, the invention may be practiced otherwise than as specifically described herein.

We claim:

1. A method in a slave device to estimate an offset between the slave device and a master device, the method comprising:
receiving a master→slave timing packet;
obtaining timing adjustment information pertaining to at least part of a communications path between the slave device and the master device, at least some of the timing adjustment information obtained otherwise than from any received master→slave timing packet, transmit and receive times of the any received master→slave timing packet, and transmit and receive times of any transmitted slave→master timing packet;
generating an estimate of the offset using the timing adjustment information and using the transmit and receive times for the master→slave timing packet,
wherein said timing adjustment information comprises an indication of a change in the communications path, and wherein said offset is a timing offset computed based on a current mean delay; the method further comprising:
transmitting and receiving timing packets on an ongoing basis to compute the current mean delay;
upon receiving said indication of the change in the communications path, estimating a correction of the current mean delay;
obtaining a new mean delay using the estimated correction of the current mean delay;
detecting a change in communications path to a different communications path by performing at least one of:
receiving a notification of the change of path; and
detecting an out of bounds delay for a timing packet; and
after the change in communications path to the different communications path, increasing a frequency of transmitting and receiving timing packets to speed up acquisition of delay characteristics for the different communications path.

2. The method of claim 1 further comprising:
transmitting a slave→master timing packet;
wherein generating an estimate of the offset using the timing adjustment information and using transmit and receive times for the master→slave timing packet comprises generating an estimate of the timing offset using the timing adjustment information and using transmit and receive times for the slave→master timing packet and the master→slave timing packet.

3. The method of claim 1 wherein:
generating an estimate of the offset using the timing adjustment information and using transmit and receive times for the master→slave timing packet further comprises generating an estimate of a fractional frequency offset using the timing adjustment information and using transmit and receive times for multiple master→slave timing packets.

4. The method of claim 2 further comprising:
generating an estimate of a fractional frequency offset using the timing adjustment information and using transmit and receive times for multiple master→slave timing packets.

5. The method of claim 1 wherein obtaining timing adjustment information comprises:
obtaining the timing adjustment information at initialization; and
obtaining updates of the timing adjustment information.

6. The method of claim 1 wherein the timing adjustment information further comprises topology information in respect of at least part of the communications path between the slave device and the master device.

7. The method of claim 2 wherein the timing adjustment information further comprises at least one of:
number of network devices in the communications path;
an indication that the communications path is composed of one of a heterogeneous set of network devices and a homogeneous set of network devices;
an indication that the communications path is composed of some number of homogeneous sets of network devices;
a depth in number of network devices;
at least one basic characteristic of at least one network device;
an indication of load types;
an estimated jitter and delay on a main and protection path;
an indication of whether load sharing is enabled; and
an indication of whether a protection event is provided and a maximum delay for protection notification.

8. The method of claim 1 wherein the timing adjustment information further comprises topology type information that identifies a type of topology relevant to the communications path.

9. The method of claim 8 wherein the topology type information identifies one of a set of pre-defined possible configurations.

10. The method of claim 8 wherein the topology type information identifies some or all of the communications path to be one of:
direct connection;
a link with fixed delay with constant jitter;
a link with small and fixed amount of asymmetrical offset;
a link having a protection path that is of fixed delay, small constant jitter, and small asymmetrical delay;
a topology in which each network device is a network device that makes adjustments to timing packets to reflect delay introduced by the network device;
a topology in which each intermediate network device is a network device that makes adjustments to timing packets to reflect delay introduced by the network device;
a topology in which any network devices that make adjustments to timing packets to reflect delay are connected through direct connections;
a topology formed of network devices that are managed and controlled by a common entity;
a topology in which no network device that makes adjustments to timing packets to reflect delay introduced by the network device;
a topology providing a managed service (leased line, E-line) for which specific management information is available, but control is by a separate entity;
a topology that is path performance bounded in terms of at least one of delay and jitter;
a topology for which there is no management visibility; and
a topology for which there is no bounded performance, unknown paths and unknown protection capability.

11. The method of claim 6 further comprising:
from the topology information determining an estimate in path asymmetry;

using the estimate of path asymmetry in estimating the timing offset.

12. The method of claim 6 wherein:
the communications path between the slave device and the master device comprises a first communications path from the slave device to the master device and a second communications path from the master device to the slave device; and
the topology information comprises path asymmetry information reflecting an asymmetry in the first communications path versus the second communications path, the method further comprising:
using the path asymmetry information in estimating the timing offset.

13. The method of claim 1 further comprising:
performing time synchronization based on the timing offset.

14. The method of claim 1 wherein generating an estimate of the timing offset comprises:
updating a mean master→slave delay based on the transmit and receive times for the master→slave timing packets and the timing adjustment information;
updating a mean slave→master delay based on the transmit and receive times for slave→master timing packets and the timing adjustment information; and
determining the timing offset according to:

timing offset=(mean master→slave delay+mean slave→master delay)/2.

15. The method of claim 14 further comprising filtering the timing offset.

16. The method of claim 2 further comprising generating an estimate of a fractional frequency offset using the timing adjustment information and using transmit and receive times for multiple master→slave timing packets, wherein said generating an estimate of a fractional frequency offset comprises:
estimating a mean delay from the master device to the slave device using transmit and receive times for multiple master→slave timing packets and using the timing adjustment information; and
generating an estimate of the fractional frequency offset using the mean delay.

17. The method of claim 2 wherein obtaining the timing adjustment information comprises at least one of:
employing DCC (Data Communication Channel) in SONET/SDH to carry the information;
employing GCC (General Communication Channel) in OTN to carry the information;
employing management packets in Ethernet; and
employing PTPv2 over UDP Signalling TLV (Type-Length-Value) in IP networks.

18. The method of claim 1 wherein:
the timing adjustment information obtained otherwise than from any received master→slave timing packet is in respect of network devices forming part of the communications path that are not already configured to make adjustments to timing packets to reflect delay.

19. The method of claim 1 wherein:
said obtaining timing adjustment information comprises receiving timing adjustment information as part of the timing packets in respect of network devices forming part of the communications path that are configured to make adjustments to timing packets to reflect delay.

20. The method of claim 19 wherein receiving timing adjustment information as part of the timing packets in respect of network devices forming part of the communications path that are configured to make adjustments to timing packets to reflect delay comprises receiving timing packets containing a correction field that has been adjusted by at least one network device that is configured to make adjustments to the correction field, and/or at least one network device equipped with an external timing packet processor that makes adjustments to the correction field.

21. The method of claim 2 wherein generating an estimate of the timing offset using the timing adjustment information and using transmit and receive times for the slave→master timing packet and the master→slave timing packet comprises using only timing adjustment information pertaining to network devices forming part of the communications path that do not already make adjustments to the timing packets to reflect delay.

22. The method of claim 1 wherein the timing adjustment information further is representative of a change in conditions in the network.

23. The method of claim 1 wherein the timing adjustment information further is representative of a change in topology.

24. The method of claim 22 wherein the timing adjustment information representative of a change in conditions in the network is a congestion indication.

25. The method of claim 2 wherein generating the estimate comprises determining a mean delay for timing packets based on the transmit and receive times for the timing packets, and the timing adjustment information comprises employing a weighted averaging approach in which each master→slave delay is given a weight that is representative of the reliability of the accuracy of the delay.

26. A method in a slave device to estimate an offset between the slave device and a master device, the method comprising:
receiving a master→slave timing packet;
obtaining timing adjustment information pertaining to at least part of a communications path between the slave device and the master device, at least some of the timing adjustment information obtained otherwise than from any received master→slave timing packet, transmit and receive times of the any received master→slave timing packet, and transmit and receive times of any transmitted slave→master timing packet;
generating an estimate of the offset using the timing adjustment information and using the transmit and receive times for the master→slave timing packet,
wherein said timing adjustment information comprises an indication of a change in the communications path, and wherein said offset is a timing offset computed based on a current mean delay; the method further comprising:
transmitting and receiving timing packets on an ongoing basis to compute the current mean delay;
upon receiving said indication of the change in the communications path, estimating a correction of the current mean delay;
obtaining a new mean delay using the estimated correction of the current mean delay;
generating an estimate of a fractional frequency offset using the timing adjustment information and using transmit and receive times for multiple master→slave timing packets;
performing frequency synchronization based on the estimate of the fractional frequency offset.

27. A method in a slave device to estimate an offset between the slave device and a master device, the method comprising:
receiving a master→slave timing packet;
obtaining timing adjustment information pertaining to at least part of a communications path between the slave device and the master device, at least some of the timing adjustment information obtained otherwise than from any received master→slave timing packet, transmit and receive times of the any received master→slave timing packet, and transmit and receive times of any transmitted slave→master timing packet;
generating an estimate of the offset using the timing adjustment information and using the transmit and receive times for the master→slave timing packet,
wherein said timing adjustment information comprises an indication of a change in the communications path, and wherein said offset is a timing offset computed based on a current mean delay; the method further comprising:
transmitting and receiving timing packets on an ongoing basis to compute the current mean delay;
upon receiving said indication of the change in the communications path, estimating a correction of the current mean delay;
obtaining a new mean delay using the estimated correction of the current mean delay,
wherein generating the estimate of the timing offset comprises:
updating a mean master→slave delay based on the transmit and receive times for the master→slave timing packets and the timing adjustment information by applying a correction to the mean master→slave delay to account for a change in conditions in the network;
updating a mean slave→master delay based on the transmit and receive times for the slave→master timing packets and the timing adjustment information by applying a correction to the mean master→slave delay to account for a change in conditions in the network; and
determining the timing offset according to:

timing offset=(mean master→slave delay mean+ slave→master delay)/2.

28. The method of claim 27 wherein the timing adjustment information further is representative of a change in topology.

29. The method of claim 27 wherein the timing adjustment information further is representative of a change in conditions in the network and is a congestion indication.

30. A method in a slave device to estimate an offset between the slave device and a master device, the method comprising:
receiving a master→slave timing packet;
obtaining timing adjustment information pertaining to at least part of a communications path between the slave device and the master device, at least some of the timing adjustment information obtained otherwise than from any received master→slave timing packet, transmit and receive times of the any received master→slave timing packet, and transmit and receive times of any transmitted slave→master timing packet;
generating an estimate of the offset using the timing adjustment information and using the transmit and receive times for the master→slave timing packet,
wherein said timing adjustment information comprises an indication of a change in the communications path, and wherein said offset is a timing offset computed based on a current mean delay; the method further comprising:
transmitting and receiving timing packets on an ongoing basis to compute the current mean delay;
upon receiving said indication of the change in the communications path, estimating a correction of the current mean delay;
obtaining a new mean delay using the estimated correction of the current mean delay,
wherein generating an estimate of the timing offset comprises:
updating a mean master→slave delay based on the transmit and receive times for the master→slave timing packets and the timing adjustment information;
updating a mean slave→master delay based on the transmit and receive times for slave→master timing packets and the timing adjustment information; and
determining the timing offset according to:

timing offset=(mean master→slave delay+mean slave→master delay)/2;

transmitting a slave→master timing packet;
and wherein at least one of:
updating a mean master→slave delay based on the transmit and receive times for the master→slave timing packets and the timing adjustment information comprises employing a weighted averaging approach in which each master→slave delay is given a weight that is representative of the reliability of the accuracy of the delay;
updating a mean slave→master delay based on the transmit and receive times for the slave→master timing packets and the timing adjustment information comprises employing a weighted averaging approach in which each slave→master delay is given a weight that is representative of the reliability of the accuracy of the delay.

31. A network device comprising:
a timing protocol module configured to receive a master→slave timing packet from a master device; the timing protocol module further configured to obtain timing adjustment information pertaining to at least part of a communications path between the network device and the master device, at least some of the timing adjustment information obtained otherwise than from any received master→slave timing packet, transmit and receive times of the any received master→slave timing packet, and transmit and receive times of any transmitted slave→master timing packet;
a timing adjustment module configured to generate an estimate of an offset using the timing adjustment information and using transmit and receive times for the master→slave timing packet;
wherein said timing adjustment information comprises an indication of a change in the communications path, and wherein said offset is a timing offset computed based on a current mean delay;
the timing protocol module being further configured to:
transmit and receive timing packets on an ongoing basis to compute the current mean delay;
detect a change in communications path to a different communications path by performing at least one of: receiving a notification of the change of path; and detecting an out of bounds delay for a timing packet; and
after the change in communications path to the different communications path, increase a frequency of transmitting and receiving timing packets to speed up acquisition of delay characteristics for the different communications path; and
the timing adjustment module being further configured to, upon receiving said indication of the change in the communications path, estimate a correction of the current mean delay; and
to obtain a new mean delay using the estimated correction of the current mean delay.

32. The network device of claim 31 wherein:
the timing protocol module is further configured to transmit a slave→master timing packet;
the timing adjustment module is configured to generate an estimate of the offset using the timing adjustment information and using transmit and receive times for the master→slave timing packet by generating an estimate of the timing offset using the timing adjustment information and using transmit and receive times for the slave→master timing packet and the master→slave timing packet.

33. The network device of claim 31 wherein the timing adjustment module is configured to generate an estimate of the offset using the timing adjustment information and using transmit and receive times for the master→slave timing packet by generating an estimate of a fractional frequency offset using the timing adjustment information and using transmit and receive times for multiple master→slave timing packets.

34. The network device of claim 32 wherein the timing adjustment module is further configured to generate an estimate of a fractional frequency offset using the timing adjustment information and using transmit and receive times for multiple master→slave timing packets.

35. The network device of claim 31 wherein the timing protocol module is configured to obtain timing adjustment information by:
obtaining the timing adjustment information at initialization; and
obtaining updates of the timing adjustment information.

36. The network device of claim of claim 31 wherein the timing adjustment information further comprises topology information in respect of at least part of the communications path between the network device and the master device.

37. The network device of claim 31 wherein the timing adjustment information further comprises topology type information that identifies a type of topology relevant to the communications path.

38. The network device of claim 36 wherein the timing adjustment module is further configured to determine an estimate in path asymmetry from the topology information, and to use the estimate of path asymmetry in estimating the timing offset.

39. The network device of claim 31 wherein:
the timing adjustment information obtained otherwise than from any received master→slave timing packet is in respect of network devices forming part of the communications path that are not already configured to make adjustments to timing packets to reflect delay.

40. The network device of claim 31 wherein:
the timing adjustment module is configured to obtain timing adjustment information by receiving timing adjustment information as part of the timing packets in respect of network devices forming part of the communications path that are configured to make adjustments to timing packets to reflect delay.

41. A network device comprising:
means for receiving a master→slave timing packet;
means for obtaining timing adjustment information pertaining to at least part of a communications path between the slave device and the master device, at least some of the timing adjustment information obtained otherwise than from any received master→slave timing packet, transmit and receive times of the any received master→slave timing packet, and transmit and receive times of any transmitted slave→master timing packet;
means for generating an estimate of the offset using the timing adjustment information and using the transmit and receive times for the master→slave timing packet,
wherein said timing adjustment information comprises an indication of a change in the communications path, and wherein said offset is a timing offset computed based on a current mean delay; the network device further comprising:
means for transmitting and receiving timing packets on an ongoing basis to compute the current mean delay;
means for estimating a correction of the current mean delay upon receiving said indication of the change in the communications path;
means for obtaining a new mean delay using the estimated correction of the current mean delay;
means for detecting a change in communications path to a different communications path comprising at least one of:
means for receiving a notification of the change of path; and
means for detecting an out of bounds delay for a timing packet; and
means for, after the change in communications path to the different communications path, increasing a frequency of transmitting and receiving timing packets to speed up acquisition of delay characteristics for the different communications path.

* * * * *